(12) United States Patent
Sørensen Møller et al.

(10) Patent No.: US 6,633,863 B1
(45) Date of Patent: Oct. 14, 2003

(54) DATABASE USEFUL FOR CONFIGURING AND/OR OPTIMIZING A SYSTEM AND A METHOD FOR GENERATING THE DATABASE

(75) Inventors: Gert Lykke Sørensen Møller, Hørsholm (DK); Claus Erik Jensen, Glostrup (DK)

(73) Assignee: Array Technology ApS, København (DK)

( * ) Notice: Subject to any disclaimer, the term of this patent is extended or adjusted under 35 U.S.C. 154(b) by 0 days.

(21) Appl. No.: 09/270,049

(22) Filed: Mar. 16, 1999

(30) Foreign Application Priority Data

Mar. 16, 1998 (DE) .............................................. 0363/98

(51) Int. Cl.⁷ .............................................. G06F 17/30
(52) U.S. Cl. .......................................... 707/2; 707/101
(58) Field of Search ..................... 707/1–6, 103 R, 707/9–10; 345/427.473, 604; 709/231, 218

(56) References Cited

U.S. PATENT DOCUMENTS

| | | | |
|---|---|---|---|
| 5,195,172 A | 3/1993 | Elad et al. | 706/62 |
| 5,276,775 A | 1/1994 | Meng | 706/51 |
| 5,515,524 A | 5/1996 | Lynch et al. | 703/13 |
| 5,594,898 A | 1/1997 | Dalal et al. | 707/2 |
| 5,701,467 A * | 12/1997 | Freeston | 707/1 |

FOREIGN PATENT DOCUMENTS

| | | | |
|---|---|---|---|
| EP | 0 486 037 A2 | 5/1992 | G06F/15/20 |
| EP | 0 510 815 A2 | 10/1992 | H03K/19/177 |
| WO | WO 90/09001 | 8/1990 | G06F/9/44 |
| WO | WO 96/02882 | 2/1996 | G06F/9/44 |
| WO | WO 96/28784 | 9/1996 | G06F/15/177 |
| WO | WO 97/15886 | 5/1997 | G06F/15/177 |
| WO | WO 97/24686 | 7/1997 | G06F/12/30 |

OTHER PUBLICATIONS

On the Technology of Array–Based Logic, Gert L. Moller, Ph.D. thesis, Electric Power Engineering Department, Technical University of Denmark, Jan. 1995. pp. 1–156.

* cited by examiner

Primary Examiner—Jean R. Homere
Assistant Examiner—Mohammed Ali
(74) Attorney, Agent, or Firm—Birch, Stewart, Kolasch & Birch, LLP

(57) ABSTRACT

A method and apparatus provide the ability to generate and use a database representing all solutions (legal combinations) satisfying all constraints of configuration problems on finite domains and/or intervals. The configuration space with all legal combinations is stored in a compact way in terms of nested arrays, where each legal Cartesian subspace has a unique index. Thus, the complete configuration space (which can be extended with object functions for optimization) is easily addressable by parallel indexing techniques and the database is therefore suitable for run-time applications (e.g. configuration on the Internet), which must be performed in real time.

34 Claims, 15 Drawing Sheets

Figure 1:
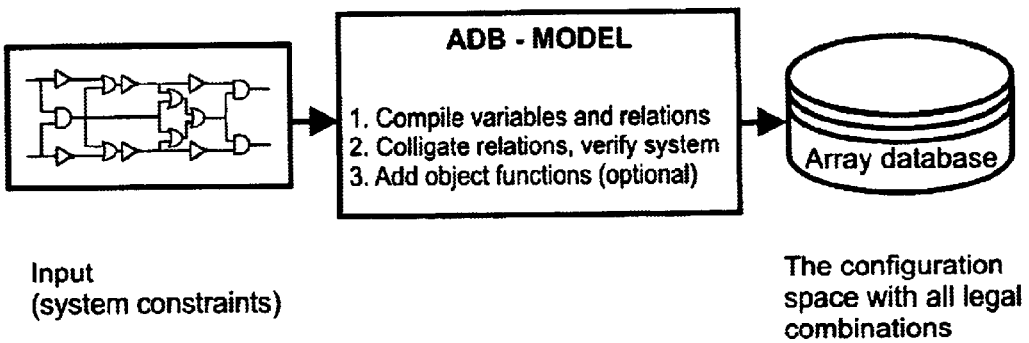

SV1: input state vector (external influences; assumptions)
SV2: deduced implications or conclusions

DATABASE USEFUL FOR CONFIGURING AND/OR OPTIMIZING A SYSTEM AND A METHOD FOR GENERATING THE DATABASE

1 BACKGROUND OF THE INVENTION

The aim of the invention is to support automatic modeling, analysis (verification) and real-time simulation of large-scale configuration problems on a standard computer (e.g. a personal computer). Mathematically speaking, such problems on finite domains or intervals can be expressed in terms of truth tables with $M^N$ combinations, each of which can assume either of the truth-values true or false (legal or non-legal). Here we are assuming N variables, each with M elements. Thus, binary variables are to be considered as a special case with M=2.

Obviously, $M^N$ combinations will cause "combinational explosion" and it is therefore not a trivial task to solve large configuration problems with a multitude of variables. Nevertheless, the present invention makes it possible to unify the seemingly contradictory requirements for completeness (all combinations must be accessible to ensure logical consistency) with compactness of representation and speed of simulation.

For example, interlocking systems for railway operation are controlled by several thousands variables representing signal values or switch positions. To illustrate, even a small interlocking system with 2000 binary variables will be characterized by the huge number of $2^{2000}$ states or combinations. Some combinations are legal (allowed), while other combinations are clearly illegal because they would cause disasters. To handle these systems with conventional technology, it has been necessary to break down the system into subsystems of sufficiently small size to allow their validation, whereby not only illegal, but also a large number of legal combinations may be excluded, resulting in a less efficient utilization of the system. In general, the system variables will not be limited to binary values but will also include different data types on finite domains (e.g. multi-valued logic, integers, or finite sets of intervals). It is highly desirable to be able to handle configuration problems in systems of that size by means of computerized tools which could provide complete and correct responses almost instantaneously.

Another example is configuration of products or services (e.g. cars, computers or travels) on the Internet. Many products are available in a multitude of variants, which must be selected by the customer from a number of mutually dependent options. Thus, only some combinations of these options are possible or legal, while other combinations are illegal due to some technical or commercial constraints. It is therefore desirable to design e-commerce tools to enable the user to select interactively only the legal combinations, even from very complex product models.

While a number of computerized configuration tools have become available, e.g. the systems disclosed in WO 90/09001 and U.S. Pat. No. 5,515,524 there is still a demand for systems which fulfil the requirements for completeness and compactness and speed of response. In this context, the term "completeness" indicates the mathematical requirement that all combinations have been verified to ensure logical consistency.

The present invention provides an elegant solution to this problem without the problem of "combinational explosion". As it will be understood from the following description, the crux of the invention is the establishment of a novel type of database, in the following termed an "array database". While the database is an optimal tool for the complex configuration problems indicated above and described in greater in the following, it will be understood that due to its unique inherent advantages, it is also useful for a wide range of applications for which conventional database systems, typically relational databases, are used at present.

A scientific/mathematical discussion of principles relevant to the invention is given in Moller, Gert L.: *On the Technology of Array-based Logic*. Ph.D. thesis, Electric Power Engineering Department, Technical University of Denmark, January 1995.

2 BRIEF DISCLOSURE OF THE INVENTION

In one aspect, the invention relates to a method for generating a database useful for configuring and/or optimizing a system spanned by variables on finite domains and/or intervals, said method comprising generating and storing, in a memory or storage medium of a computer, an addressable configuration space of the entire system in terms of all legal Cartesian subspaces of states or combinations satisfying the conjunction of substantially all system constraints on all variables, with all interconnected legal Cartesian subspaces being addressable as legal combinations of indices of link variables, so as to establish a database in which substantially all legal solutions in the system are stored as nested arrays.

In the following, the database generated according to the invention will be termed an "array database", this term reflecting the fact that all legal solutions are stored in the database as one or more nested arrays.

Definitions and explanations relevant to some of the terms used in the present specification and claims are as follows:

"Configuring" means establishing substantially all legal combinations of the variables satisfying substantially all the constraints on the system. Preferably, all legal combinations of the variables satisfying all the constraints on the system are established, in which preferred case the legal Cartesian subspaces of states or combinations will satisfy the conjunction of all system constraints on all interconnected variables.

"Optimizing" means applying a heuristic selection of combinations within a set of legal combinations.

The term "a system spanned by variables on finite domains and/or intervals" indicates that each variable of the system consists of a finite set of elements or state values (e.g., logical truth values) or a finite set of intervals.

The term "An addressable configuration space" indicates that substantially all legal combinations are explicitly represented; in the preferred case, all legal combinations are explicitly represented.

"A Cartesian subspace" is a compact representation of one or more legal combinations, all combinations being derivable/calculated/ as the Cartesian product of the elements or state values for each variable.

"System constraints" are the relations (propositional functions) on variables defined for the system.

"Interconnecting variables" indicates variables present in at least two relations.

"A link variable" means a variable generated by the method according to the invention and added to a given relation with a unique index which identifies one Cartesian subspace.

"Interconnected legal Cartesian subspaces" means legal Cartesian subspaces with at least one common variable.

It is a crucial feature of the invention that all illegal states or combinations violating the system constraints are excluded from the relations. Such exclusion of illegal states or combinations can preferably be performed while the database is generated by the method according to the invention, the illegal states or combinations being excluded whenever identified. A state of contradiction or inconsistency is present in a system if just one relation of the system has no legal combination or state. On the other hand, a system is said to be consistent if at least one state or combination is legal, i.e. satisfying all system constraints. If, in the generation of the database, just one relation of a system is found to have no legal combination or state, then that whole system is in a state of contradiction or inconsistency and must be excluded.

In the following, the process of colligating relations (that is, combining relations to arrive at a more complex subsystem or system) is discussed in greater detail. It will be understood that on each level of the colligation process, inconsistencies or contradictions will be identified and will, thus, result in exclusion of the colligated subsystem or system. Thus, when the generating process has been completed, the system will be consistent, as manifested by all relations having at least one legal Cartesian subspace.

In the present specification and claims, the term "system" is used about an entire system of variables or, alternatively, about a part of an entire system of variables. In all cases relevant to the present invention, the system, understood in this manner, is completely defined in that every combination under the system is either legal or illegal with respect to all system constraints relevant to the use of the database and preferably with respect to absolutely all system constraints. Thus, the term system, used about an entire system of variables, indicates, in the context of the claims and the specification, that the entire system is completely defined with respect to all system constraints relevant to the use of the database, and preferably with respect to absolutely all system constraints. When a system of variables is not completely defined in the above sense of this term, then only that part of the system which is in fact completely defined is covered by the tern "system" as used in the claims. The term "substantially", as used in claim 1, indicates that it is possible to have a system which is not defined with respect to system constraints that are not relevant to the use of the database. The them "substantially" can also indicate a system in which the process of colligation has not been completed, and where the runtime environment must be adapted to perform certain tests for consistency. While the latter variant is not considered ideal, it may nevertheless apply for certain applications of the invention where the realtime capability of the runtime environment is not a requirement.

As indicated above, the system constraints may be determined by conjugating one or more relations, each relation representing the legal Cartesian subspaces of states or combinations on a given subset of variables. The conjugation of the one or more relations comprises calculating the Cartesian subspaces satisfying the combined constraints of the one or more relations. If no relations have common variables, no further action is required to conjugate the relations.

According to an important preferred feature of the invention, all relations with at least one common variable are colligated. The colligation comprises conjugating the constraints of two or more relations being connected by having common variables to establish the Cartesian subspace(s) satisfying the combined constraints of the two or more relations.

The colligation of the two or more relations will normally be performed by joining the two or more relations up to a predetermined limit. Joining comprises the operation of replacing a set of relations with a single relation satisfying the combined constraints of the set.

The set of relations is not limited to two relations but can in general be any finite number of relations. In a preferred embodiment of the invention the case where three or more relations are joined is typically decomposed into a number of pairwise joins. This pairwise joining can comprise a predetermined strategy or the joining can be in a random order.

The joining process will typically reduce the number of relations, and the resulting number of relations are then colligated by linking them and grouping them into one or more cluster(s) of relation(s).

A cluster can comprise one relation or a set of interconnected relations. These clusters will be described in greater detail in the following.

The linking of the relations consists of adding link variables and adding one or more calculated relation(s) representing the constraints on the link variables.

The linking of relations can be within a cluster or between clusters. The linking between two clusters may be performed by establishing a link relation comprising two link variables, while for a linking within a cluster the link relation(s) comprises all link variables on the relations in the cluster.

If three or more relations interconnected with common variables are generating cycles or closed paths, then they are grouped into a single cluster comprising the three or more relations. As a consequence the resulting cluster(s) are interconnected without cycles, i.e. in a tree structure.

The tree structure makes it possible to ensure completeness of deduction in the run time environment by state propagation, for example when a configuration or optimization is performed.

The term "completeness of deduction" indicates that all logical consequences must be deduced on one or more variables. In important embodiments of the invention, the completeness of deduction relates to all logical consequences on all variables, but as indicated above, the invention is not limited to that.

When the array database is to be used for optimization, one or more object functions are incorporated. An object function of a given subset of variables, the object function deriving characteristics of the given subset of variables, is linked to the complete configuration space by deducing the constraints imposed by the object function on each link variable connected to the given subset of variables.

After the array database has been generated by the method according to the invention, object functions can provide information between a set of variables and a set of object function values, e.g., price, weight, color.

If a set of object function values does not have a "natural" order, e.g. as numbers, an arbitrary order can be assigned to the set of object function values.

The characteristics of the object function may be determined and the constraints on the link variables deduced on each combination of the given variables, the result being represented as a relation on the object function, the given variables, and the link variables.

These characteristics can be the values of the object function given by functional mapping of a set of independent variables or a set of constrained variables. The mapping can also be a general relation yielding one or more object function values for each combination of the variables.

In another aspect, the invention relates to a method for configuring and/or optimizing a system spanned by variables on finite domains, said method comprising providing a database in which substantially all legal solutions in the system are stored as nested arrays and deducing any subspace, corresponding to an input statement and/or inquiry, of states or combinations spanned by one or more variables of the system represented by the nested arrays by deriving the consequences of a statement and/or an inquiry by applying the constraints defined by the statement and/or inquiry to the database.

"Deducing" means deriving or determining all logical inferences or conclusions from a given set of premises, i.e. all the system constraints.

"Inquiry" means a question for which the array database can provide all answers.

A question could be about the legal combination(s) of a given set of variables satisfying the system constraints and possibly also satisfying an external statement.

An external statement can be a number of asserted and/or measured states and/or constraints from the environment.

Thus, a deduction of any subspace of states or combinations is performed on a given subset of variable(s) either without or colligated with asserted and/or measured states and/or constraints from the environment.

The interaction between the system represented by the array database and the environment is suitably performed by means of a state vector (SV) representing all legal states or values of each variable.

Thus, an input state vector (SV1) may represent the asserted and/or measured states from the environment, while an output state vector (SV2) may represents deduced consequence(s) on each variable of the entire system when the constraints of SV1 are colligated with all system constraints in the array database.

The deduction can be performed by consulting one or more relation(s) and/or one or more object function(s) at a time by colligating the given subset of variables in the relation with the given subsets of states in the state vector and then deducing the possible states of each variable.

The consultation of a relation can be performed by colligating, e.g. joining, the relation and the states of the variables present in the relation. The result of the consultation can be the projection (union of all elements) on each variable of the colligated relation, or the result can be the colligated relation. The colligation can of course be a joining, but it should be evident from the discussion given herein that the consultation of each relation is not limited thereto.

In a preferred embodiment of the invention two or more variables are colligated in parallel; the projection on two or more variables can similarly be performed in parallel. The invention is not limited to such parallel implementation, and the invention can just as well be implemented sequentially.

In one embodiment of the invention completeness of deduction is obtained by consulting connected relations, until no further consequences can be deduced on any link variable. This operation is termed "state propagation". Such state propagation comprises consulting two or more relations in parallel. The invention is of course not limited to such parallel implementation, and, due to the cluster structure, the invention can just as well be implemented sequentially.

An important feature of the configuration and/or optimization according to the invention is that the state of contradiction can be identified, when no legal states or values are deduced when consulting at least one relation.

3 FIGURES

Figure 2:
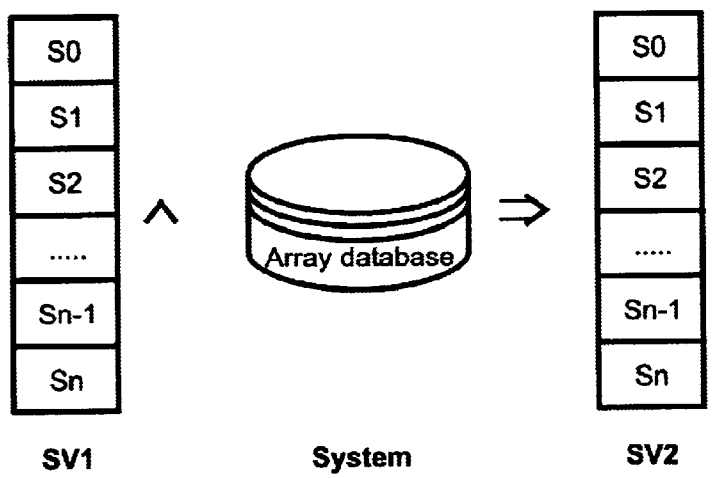
Figure 3:
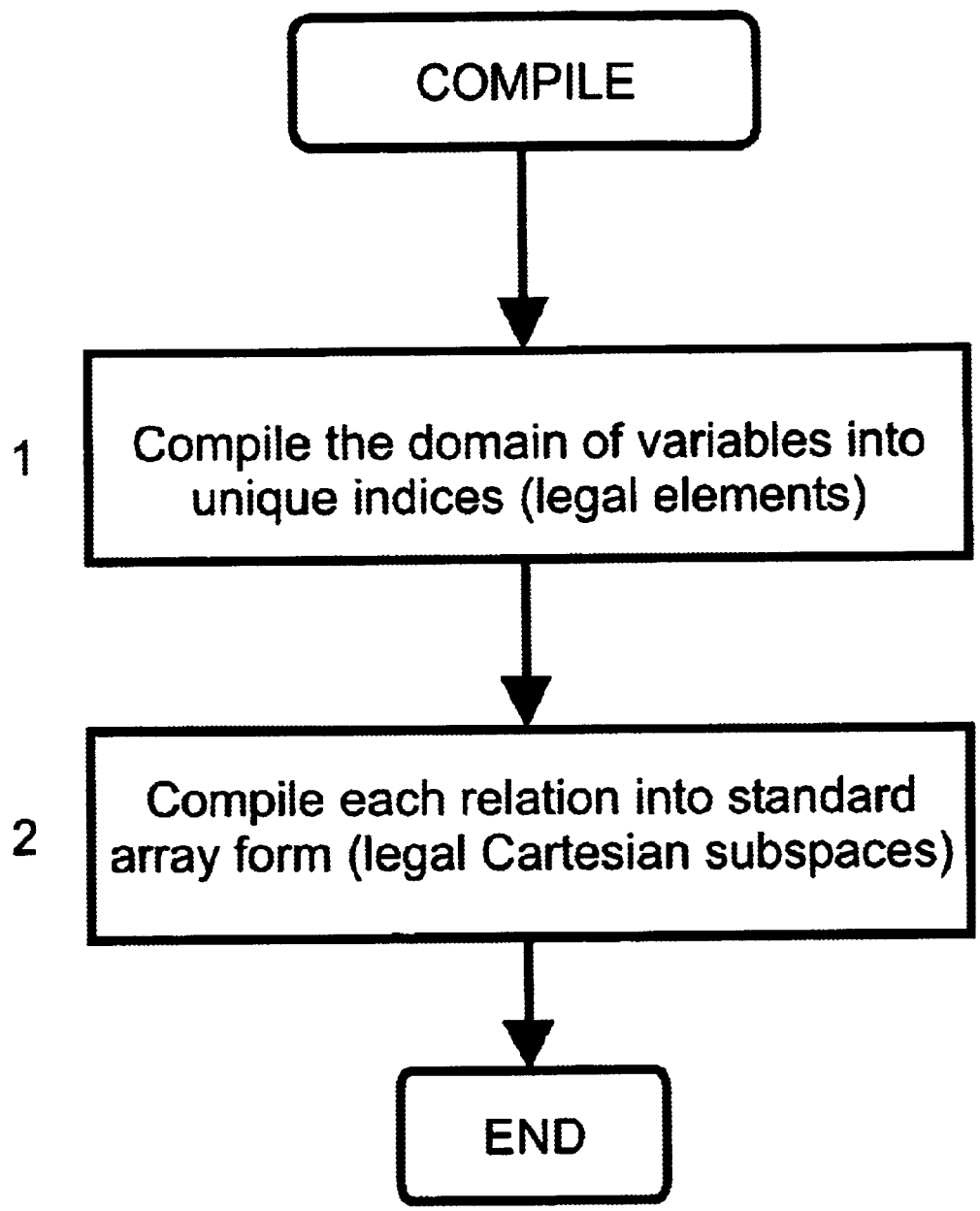
Figure 4:
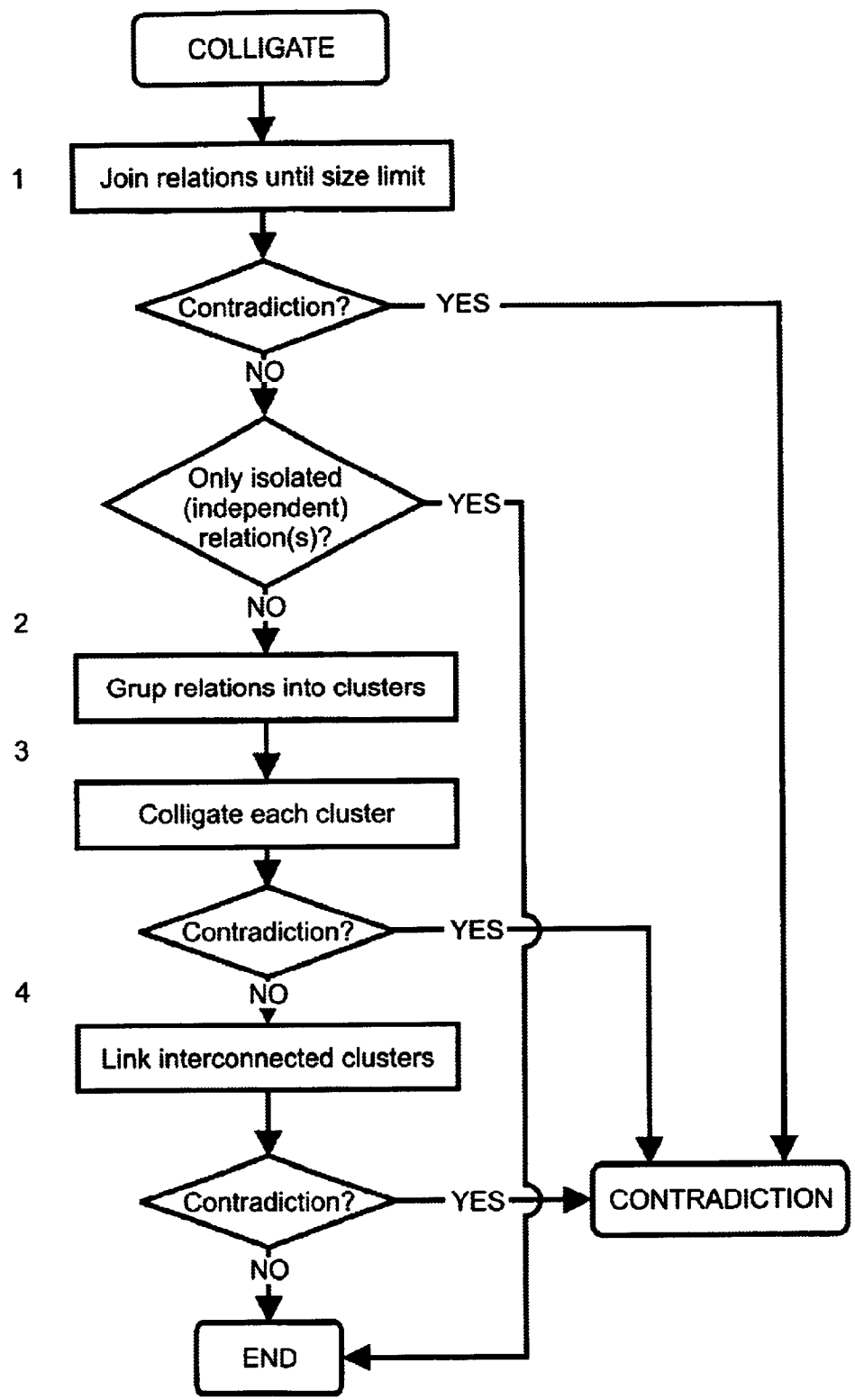
Figure 5:
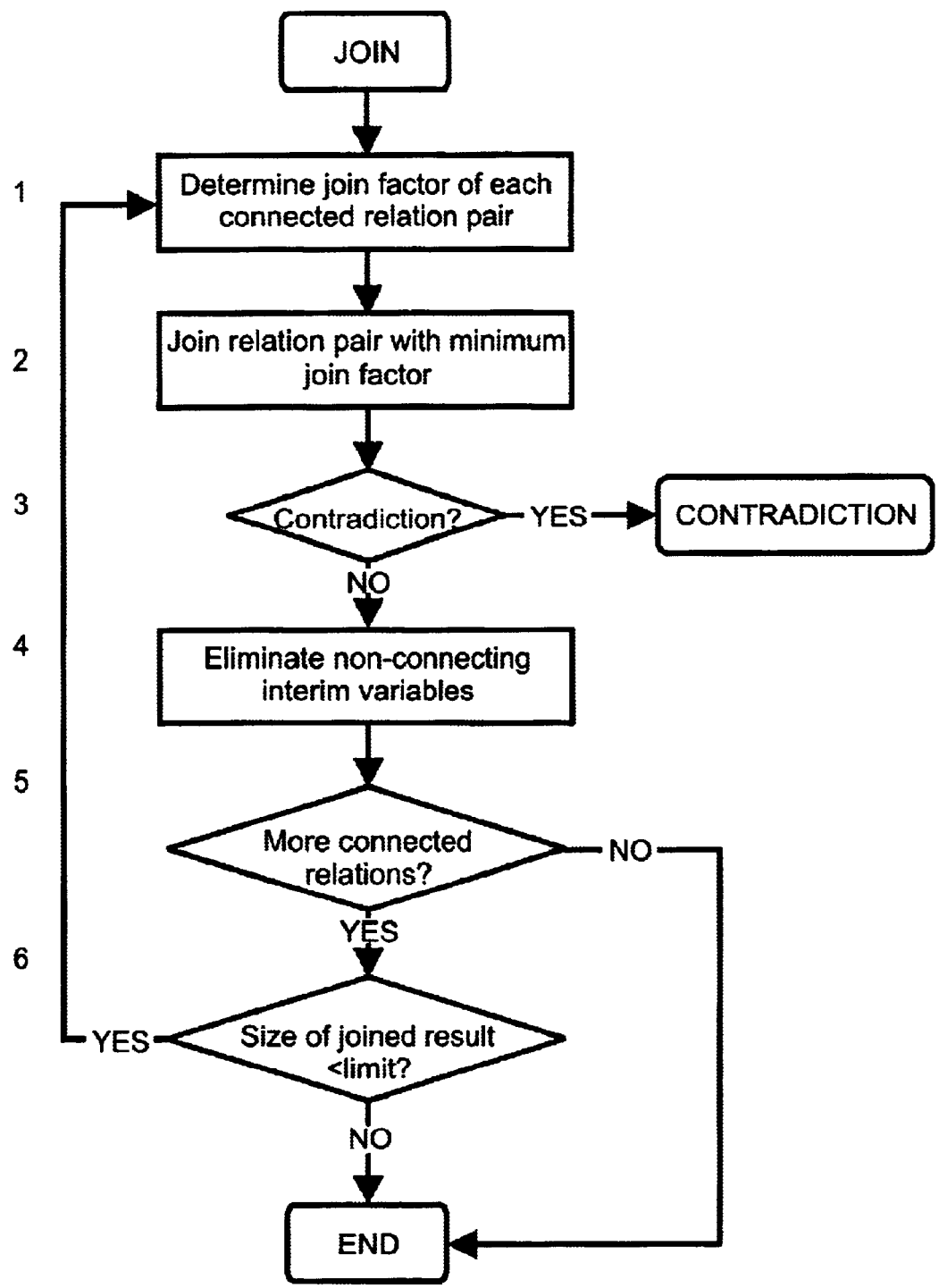
Figure 6:
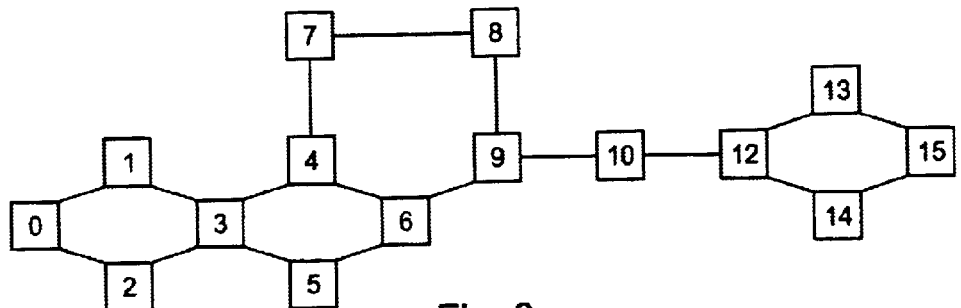
Figure 7:
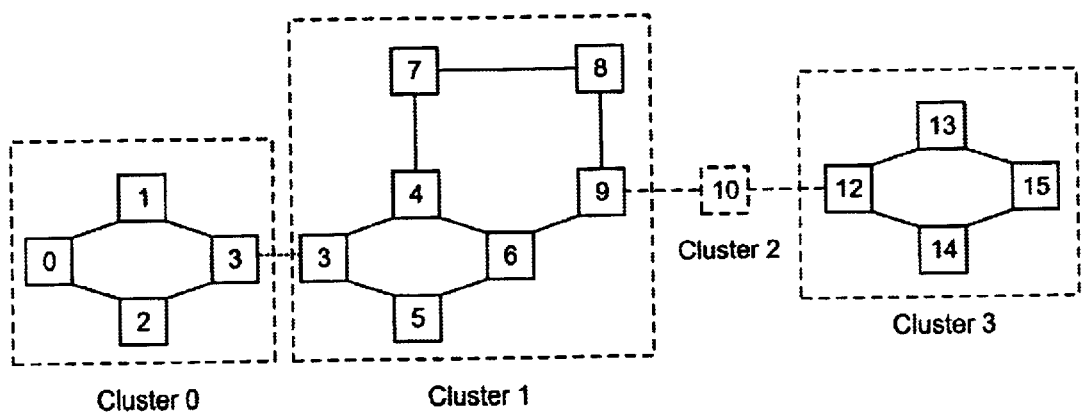
Figure 8:
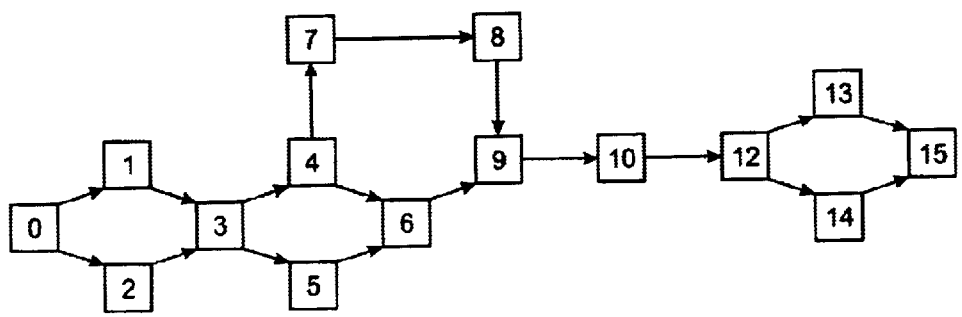
Figure 9:
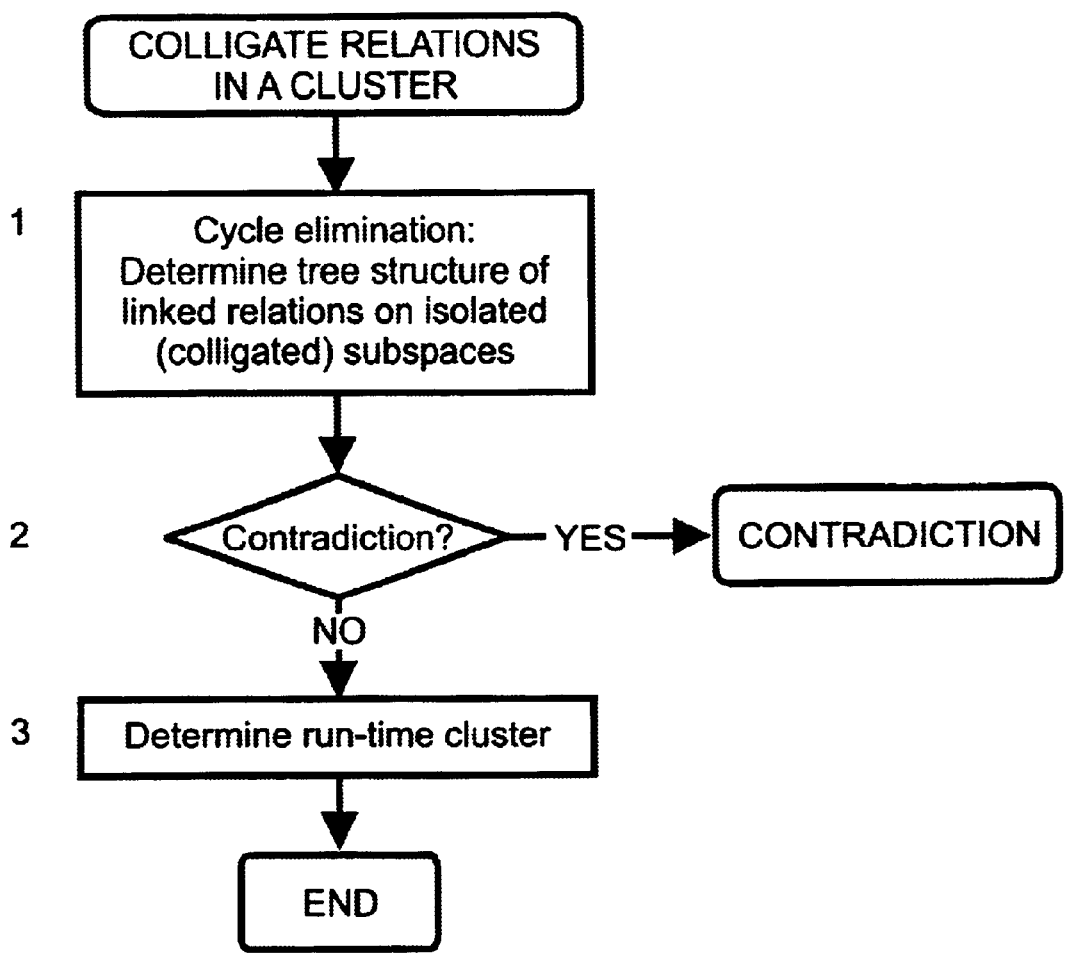
Figure 10:
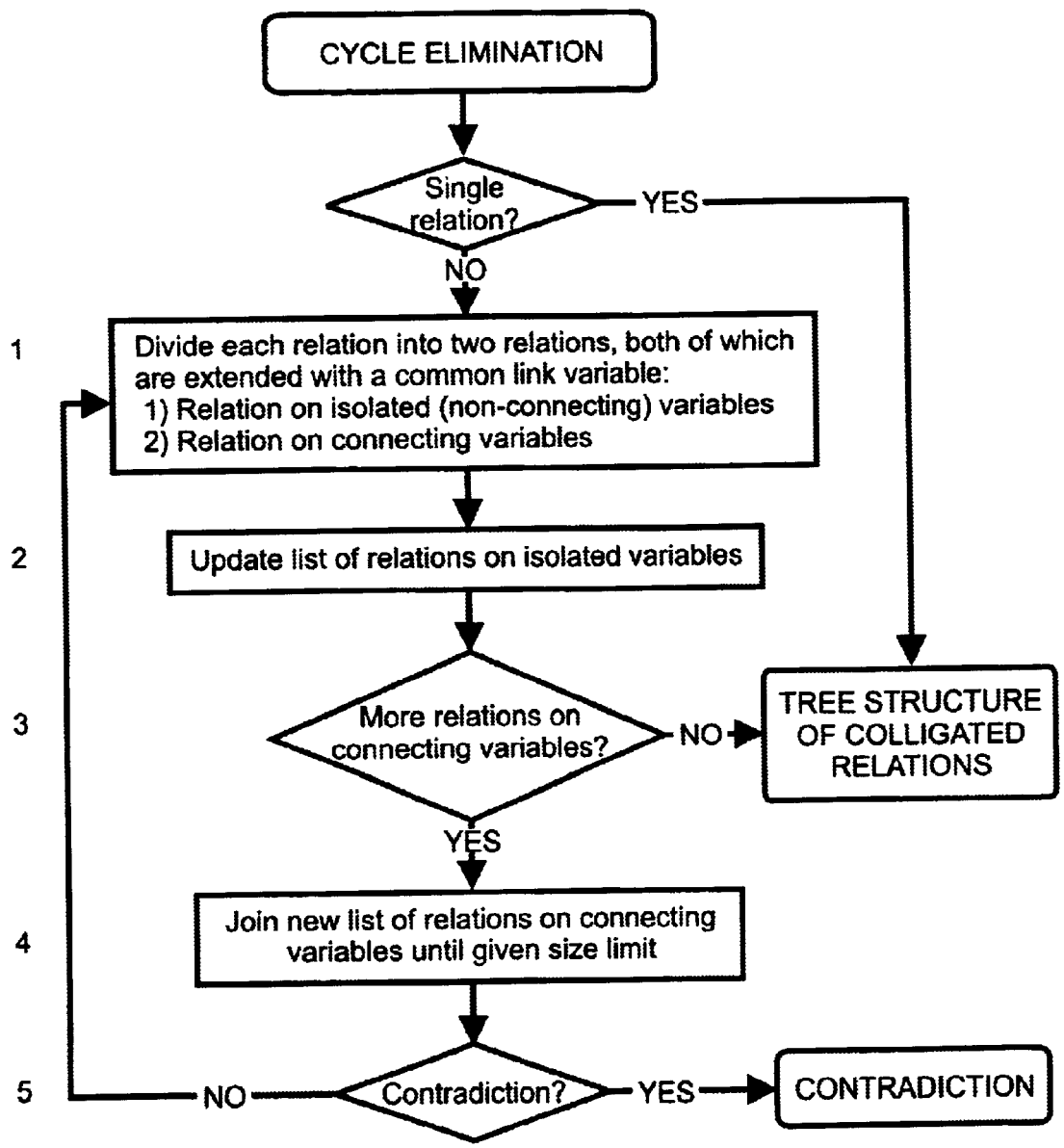
Figure 11:
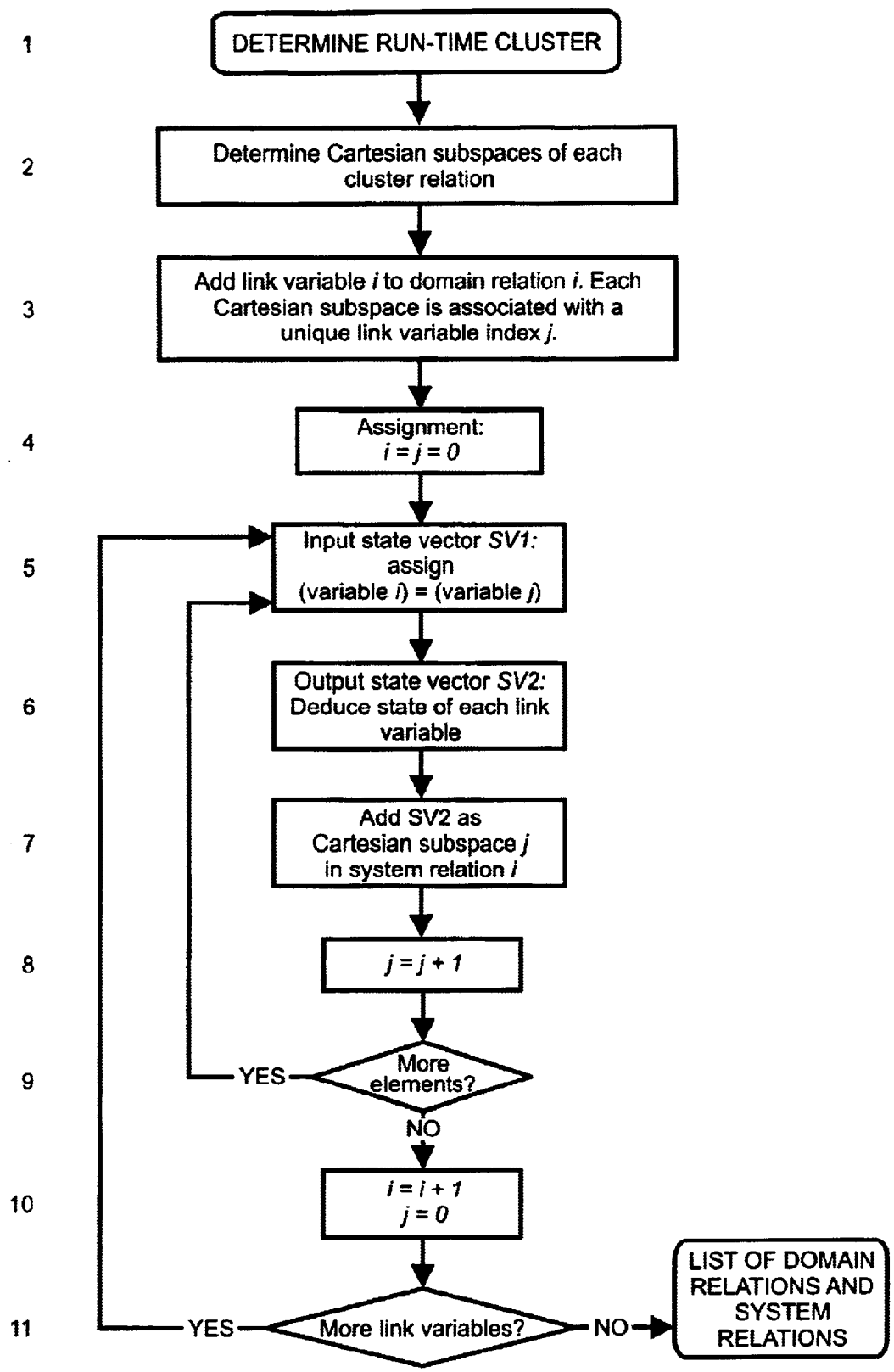
Figure 12:
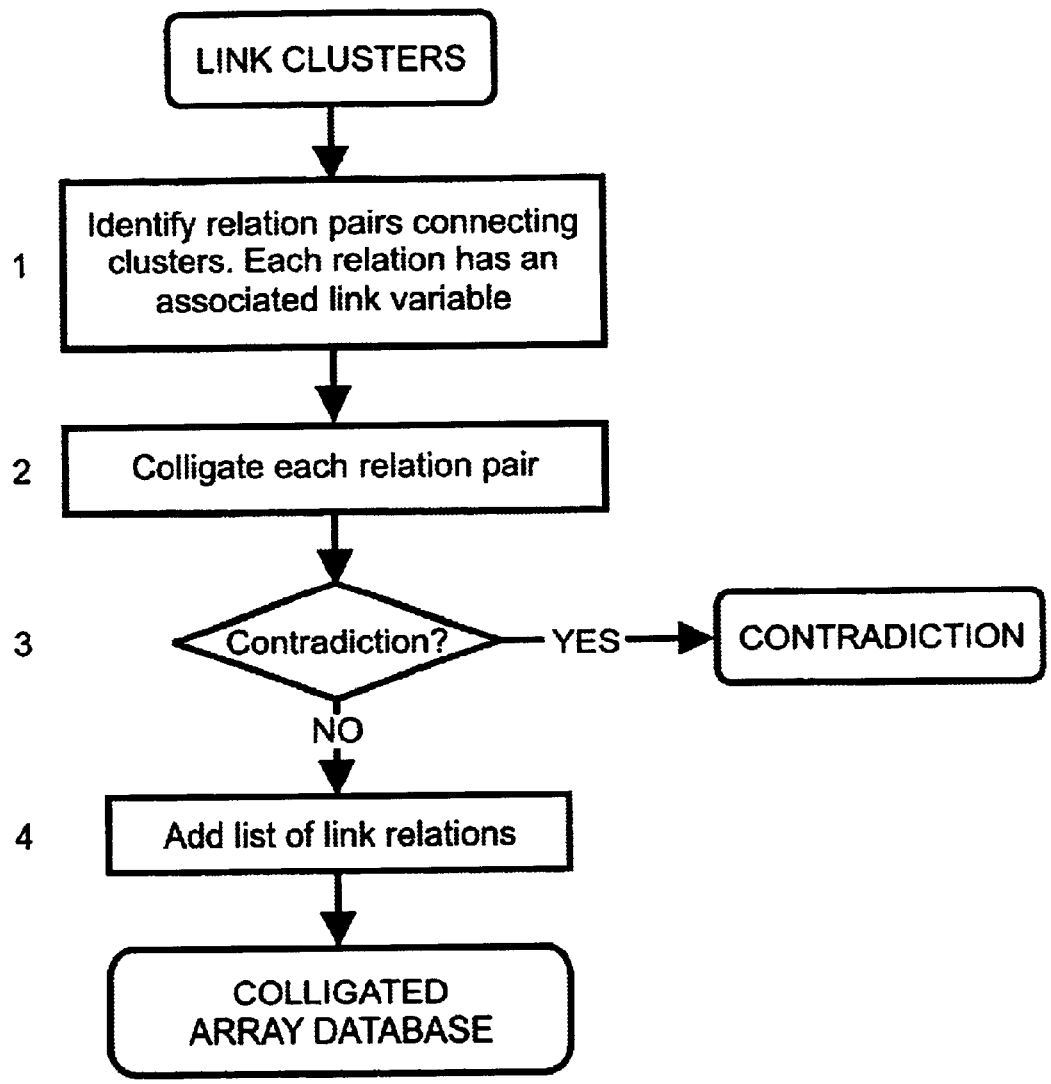
Figure 13:
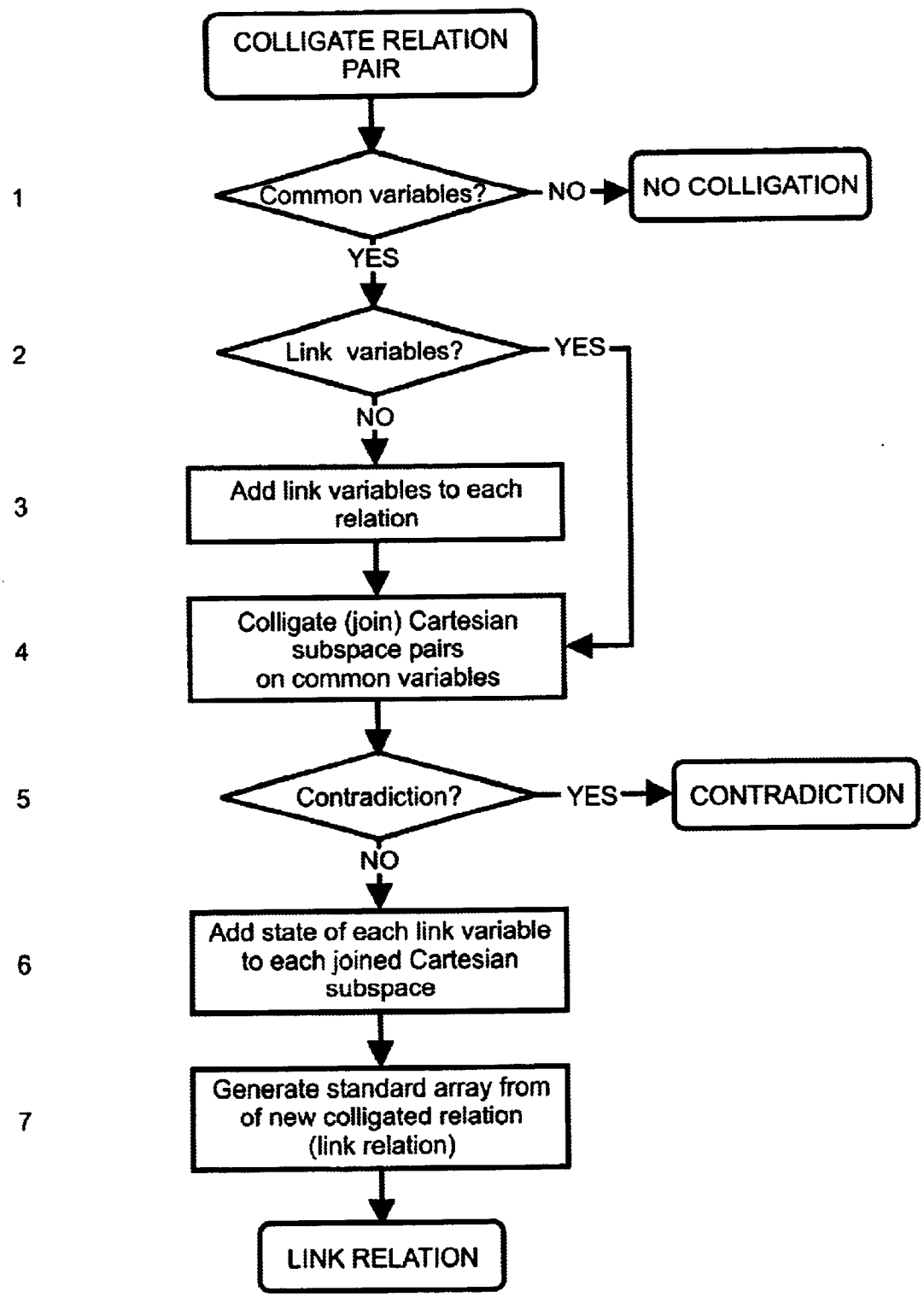
Figure 14:
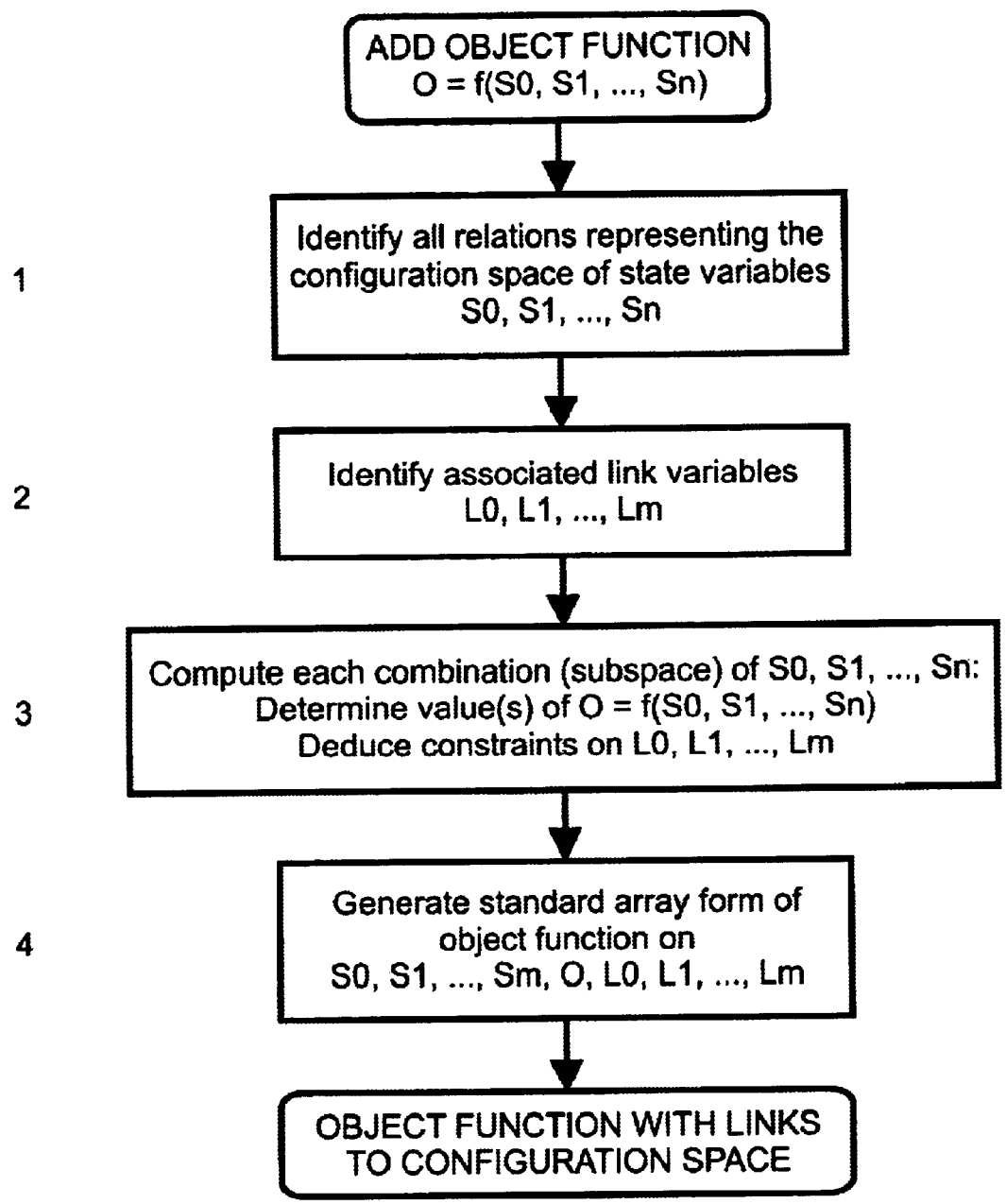
Figure 15:
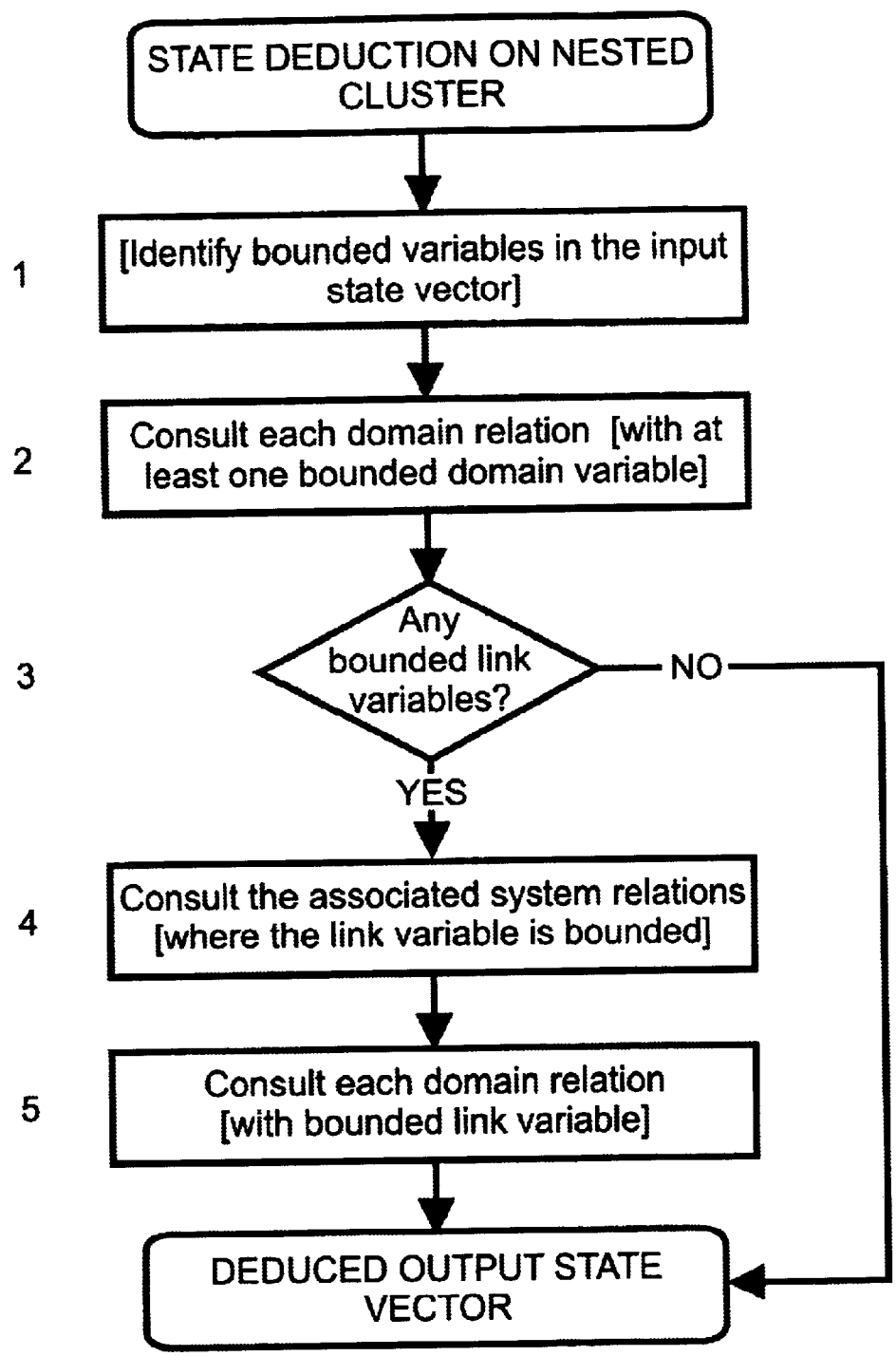
Figure 16:
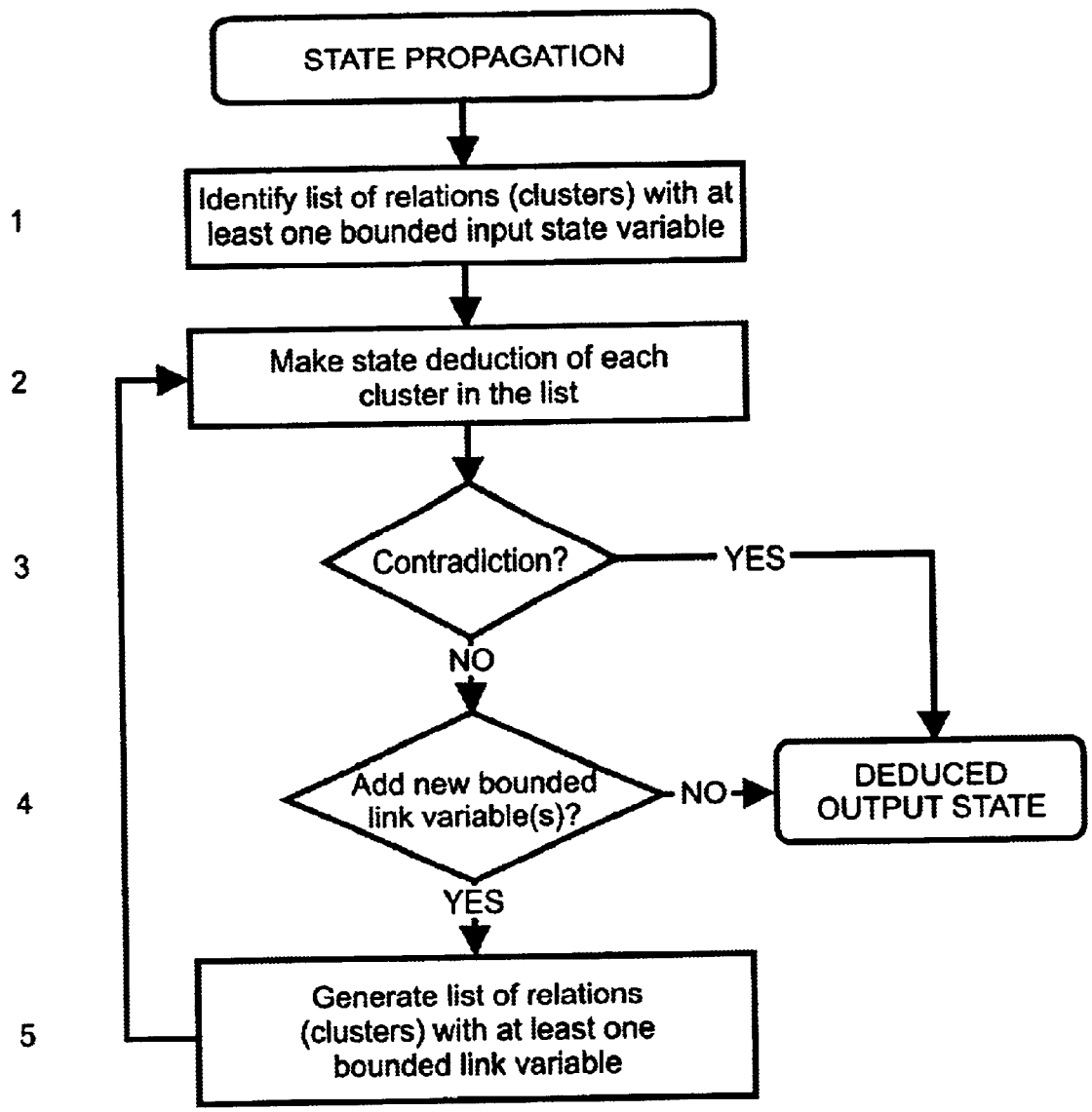
Figure 17:
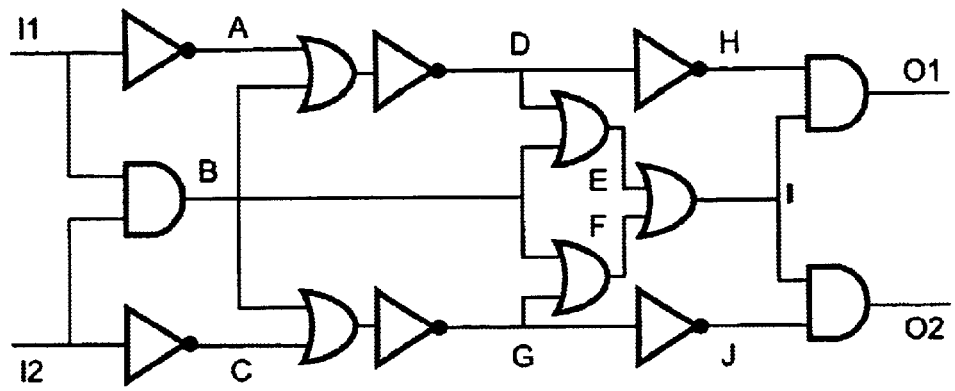
Figure 18:
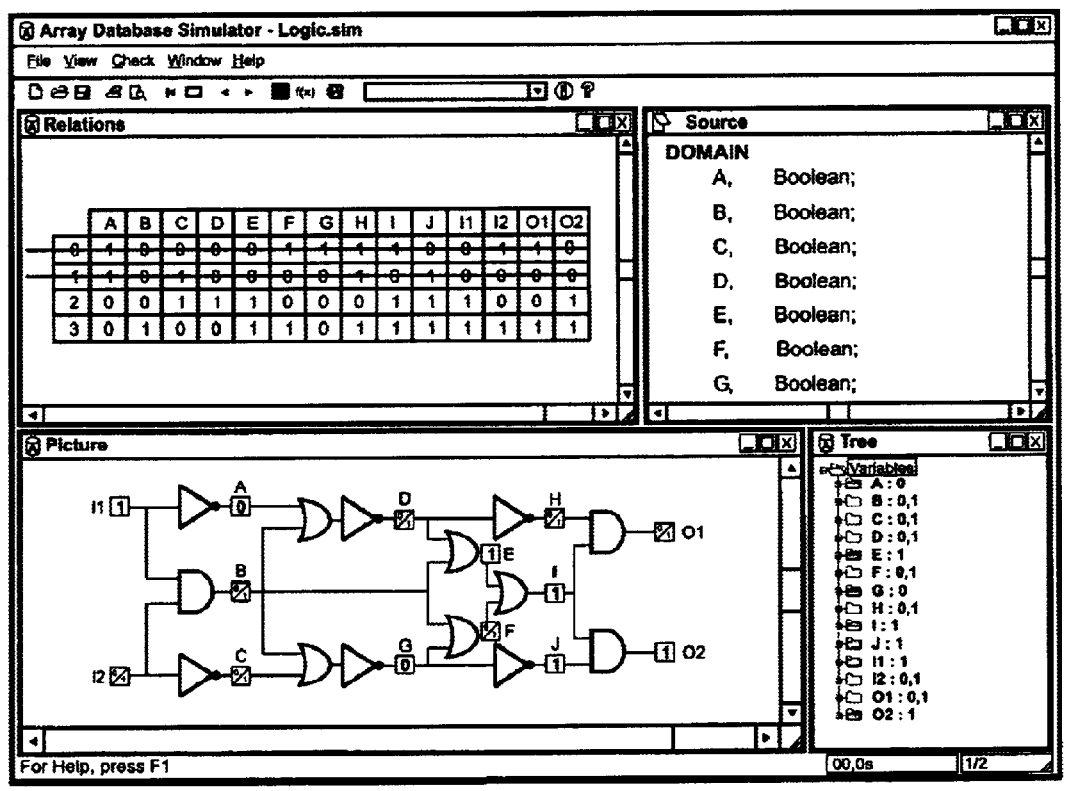
Figure 19:
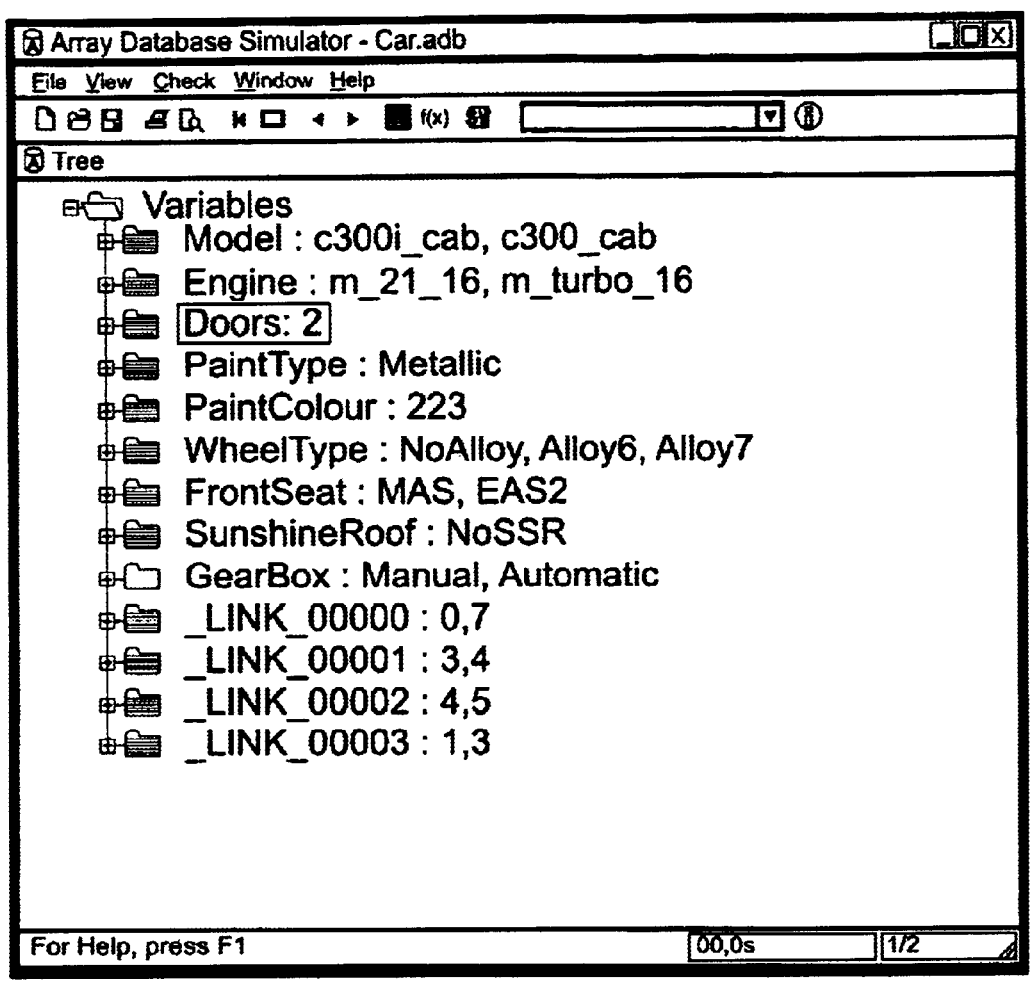

In the following the invention will be described in greater detail with reference to the figures:

| | |
|---|---|
| FIG. 1 | Modeling an array database |
| FIG. 2 | Array database simulation (state deduction) |
| FIG. 3 | Compilation of variables and relations |
| FIG. 4 | Colligation |
| FIG. 5 | Strategy for joining a list of relations |
| FIG. 6 | Colligation graph of relations |
| FIG. 7 | Colligation graph of clusters (tree) |
| FIG. 8 | Directed colligation graph of connected functions (input-output dataflow) |
| FIG. 9 | Colligating relations in a cluster |
| FIG. 10 | Cycle elimination yielding a tree structure of colligated relations |
| FIG. 11 | Determination of run-time cluster with added system relations |
| FIG. 12 | Linking clusters by colligating connected relations |
| FIG. 13 | Colligation of relation pair by projection on link variables |
| FIG. 14 | Linking an object function to the configuration space |
| FIG. 15 | The state deduction on a single cluster |
| FIG. 16 | State propagation on interconnected clusters (acyclic connection of relations) |
| FIG. 17 | Combinational logic network |
| FIG. 18 | User interface example |
| FIG. 19 | User interface example |

4 SUMMARY OF THE FOLLOWING DISCLOSURE

The array database (to be termed ADB in the following) is a compact, yet complete representation of all legal combinations of configuration problems on finite domains or intervals. The configuration space of legal states or combinations is represented geometrically in terms of nested data arrays, and the ADB can be simulated very efficiently by simple operations on these arrays. Each step in the process of ADB modeling and simulation is explained in the Chapters 5 and 6, respectively.

The major data flow of ADB modeling is summarized in FIG. 1. Input is a user-defined specification of the system constraints in terms of a set of rules or relations on a given set of variables. The ADB is modeled in a three-step procedure as sketched in the process block ADB-MODEL in FIG. 1.

| | |
|---|---|
| 1. | Compile variables and relations (Chapter 5.1):<br>Each user-defined variable and each relation is compiled into the internal array representation. At this stage, the relations are considered as independent items. |
| 2. | Colligate relations, verify system (Chapter 5.2):<br>The configuration space of the entire system is determined by colligating interconnected relations (constraint elimination). The system is simultaneously tested for logical consistency and redundancy. |
| 3. | Generate object functions (Chapter 5.3):<br>Optionally, the relations may be extended with further attributes, when the legal combinations satisfying the system constraints are associated with values or object functions to be optimized like, say, a price or a weight. |

At this stage, the process of ADB modeling is finished. The entire configuration space can now be addressed by coordinate indexing and other simple operations on the nested arrays.

The major operation of ADB simulation is sketched in FIG. 2 and will be described in more detail in Chapter 6.

Each item of the state vector SV represents the state (the legal values) of the associated variable. In the input state vector SV1, one or more variables are bounded due to external measurements or assertions. SV2 represents the resulting constraints on all variables. An important technological requirement is completeness of deduction; that is, all constraints on the variables in the output state vector must be deduced.

The most important technological novelty of the ADB can be summarized as follows:

1. ADB simulation is performed with completeness of deduction in real-time-with predictable use of processing time and memory. The ADB simulation is therefore suitable for embedded configuration or control systems and performs well on small computers.
2. A precondition for (1) is that all relations are colligated before simulation and that the configuration space of the entire system is represented geometrically in terms of nested arrays. The entire system is automatically tested for logical consistency (verification). ADB modeling is not a real-time task. On large systems, the modeling process can with advantage be computed on a dedicated modeling server with multiple processors.
3. One common representation of all system constraints (the standard array form of relations) unifies prepositional logic, predicate logic (multi-valued logic) and relational algebra.
4. All processing on the standard array form (ADB modeling and simulation) is based on a few fundamental array operations, all of which are suitable for parallel processing.

The different rule-based systems on the market today are representing rules or relations as independent items (no colligation). Thus, these rules must be manipulated individually by search rather than simple geometrical operations on arrays. Processing time therefore depends on the extent of search, which is a problem in applications where completeness of deduction must be ensured in real-time (e.g. railway interlocking systems).

5 ADB MODELING

Basically, the task of ADB modeling is constraint elimination; that is, all non-legal combinations must be eliminated yielding an explicit representation of all legal combinations or legal Cartesian subspaces.

5.1 Compile Variables and Relations

Input is the user-defined system constraints in terms of variables (on different data types or scales of measurement) and rules or relations on these variables. The compilation is a two step procedure as shown in FIG. 3.

5.1.1 Compile the Domain of Variables

The domain of each variable is any ordered finite set (a list) with n unique items. The domain {False, True} of a propositional variable is thus a special case with n=2. The list may be an explicit representation of all elements in a finite domain, or, in the case of large or maybe even infinite numerical domains, an ordered set of disjoint intervals.

As an example, we will consider the global domain of a system with six different state variables illustrated in Table 1.

TABLE 1

Domain of system with six state variables

| State Index | variable | Domain | Array representation |
|---|---|---|---|
| 0 | A | {False True} | 0 1 |
| 1 | WIDTH(x) | {1 4 5} | 1 4 5 |
| 2 | LENGTH(x) | {2 4 6 8} | 2 4 6 8 |
| 3 | ALARM | {Off On} | 0 1 |
| 4 | COLOUR(x) | {Red Yellow Green Blue} | 0 1 2 3 |
| 5 | TEMP(x) | {x ∈ R\|11 < x ≤ 30 v x ≥ 100} | 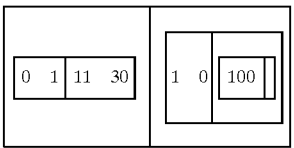 |

A and ALARM are propositional variables with the length n=2, while COLOUR(x) is a predicate variable representing a nominal scale measurement with n=4. In the internal array representation, each measurement is given by its associated domain index. LENGTH(x) and WIDTH(x) are simple ordinal scale measurements with an explicit representation of all domain elements, while TEMP(x) illustrates an interval scale measurement given by a finite set of intervals. An interval is defined by its lower and upper boundary given by the value and type of each boundary (0=open, 1=closed).

5.1.2 Compile Each Relation Into Standard Array Form

Each user-defined relation on a subset of domain variables is compiled into the standard array form, which is a nested array with two items. The first item is the set of legal Cartesian subspaces, while the second item is the domain indices of the associated state variables. All the succeeding processing on the relations is based on this common representation, which may be conceived as the basic component of the ADB.

EXAMPLE

Given the following relation on the variables WIDTH and LENGTH in Table 1:

R: WIDTH is less than LENGTH

That is, the complete state space of legal and non-legal combinations is:

TABLE 2

| R: | 2 | 4 | 6 | 8 | (LENGTH) |
|---|---|---|---|---|---|
| 1 | 1 | 1 | 1 | 1 | |
| 4 | 0 | 0 | 1 | 1 | |
| 5 | 0 | 0 | 1 | 1 | |

(WIDTH)

The standard array form of Table 2 is depicted below as tables in two isomorphic forms with eight legal combinations (expanded form) or, alternatively, two legal Cartesian subspaces (compressed form):

TABLE 3

| WIDTH | LENGTH |
|---|---|
| a) Expanded | |
| 1 | 2 |
| 1 | 4 |
| 1 | 6 |
| 1 | 8 |
| 4 | 6 |
| 4 | 8 |
| 5 | 6 |
| 5 | 8 |
| b) Compressed | |
| 1 | 2 4 6 8 |
| 4 5 | 6 8 |

EXAMPLE

The compiled array form of the relation TEMP(>120)→ALARM on the domain in Table 1 is:

TABLE 4

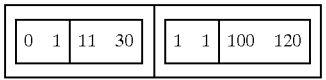

5.2 Colligate Relations

Mathematically speaking, the constraints of the entire system are the conjunction of all relations. So far, during compilation, we have considered the user-defined relations as independent items. The configuration space of the complete system is now computed by colligating the interconnected relations (elimination of the connectivity constraints).

Simultaneously, the system is tested for logical consistency: when a local configuration space is empty, the conjunction of all system constraints yields a contradiction. Moreover, redundant and non-constrained information is eliminated automatically.

The procedure shown in FIG. 4 is adopted.

5.2.1 Join Relations until Size Limit

The simplest operation of colligation is to join relation pairs with common variables into single relations representing the conjunction of the pair. Connected relations are joined whenever convenient; that is, when the size of the joined result is less than a given limit. When two relations have many common variables, the joined relation will be smaller than the arguments. Similarly, when the relations are sparsely connected, the joined relation may blow up in size. In the case of contradiction (logical inconsistency), the configuration space of the joined relation is empty. Isolated (non-connecting) variables without importance for the system simulation (interim variables) may be eliminated.

The strategy for joining a list of relations is shown in FIG. 5. The join factor or connectivity factor of a relation pair is used to predict the size of the joined result. The join factor of a connected pair is defined as follows:

$$JF \equiv \frac{I_0 \times I_1 \times \left(A_0 \times \left(1 + \ln\frac{T_0}{A_0}\right)\right) \times \left(A_1 \times \left(1 + \ln\frac{T_1}{A_1}\right)\right)}{C^2}$$

where:

| | |
|---|---|
| $I_i$: | number of isolated variables in relation i |
| $A_i$: | size of relation i (number of Cartesian subspaces) |
| $T_i$: | size of relation i (number of tuples (combinations)) |
| C: | number of common variables + number of common interim variables |

EXAMPLE

Given the small system with three relations R0, R1, R2:

| R0: | (A ∨ B) ⇒ (C ∨ D) |
| R1: | C ⇒ E ∧ F |
| R2: | D ⇒ E ∧ G |

The compilation of each relation yields:

TABLE 6

| R0 | | | | R1 | | | R2 | | |
|---|---|---|---|---|---|---|---|---|---|
| A | B | C | D | C | E | F | D | E | G |
| 0 | 0 | 0 | 0 | 0 | 0 1 | 0 1 | 0 | 0 1 | 0 1 |
| 0 1 | 0 1 | 0 1 | 1 | 1 | 1 | 1 | 1 | 1 | 1 |
| 0 1 | 0 1 | 1 | 0 | | | | | | |

The relations in Table 6 may be joined into a single relation R=R0^R1^R2 representing the complete configuration space:

TABLE 7

| R = join R0 R1 R2 | | | | | | |
|---|---|---|---|---|---|---|
| A | B | C | D | E | F | G |
| 0 | 0 | 0 | 0 | 0 1 | 0 1 | 0 1 |
| 0 1 | 0 1 | 0 | 1 | 1 | 0 1 | 1 |
| 0 1 | 0 1 | 1 | 1 | 1 | 1 | 1 |
| 0 1 | 0 1 | 1 | 0 | 1 | 1 | 0 1 |

We have thus finished the colligation task on this small example; all constraints of the isolated relations as well as the connectivity constraints are represented in the joined relation. The result of modeling the system is thus an array database with the single relation depicted in Table 7.

In general, the array database will contain more than a single relation, when systems scale up.

5.2.2 Group Relations Into Clusters

At this stage, it is not possible to join further relations within the user-defined size limit. The colligation strategy now depends on the properties of the colligation graph depicting the structure of interconnected relations. The relations are represented by the nodes, while an arc linking two nodes (relations) represents the common variables.

Two different kinds of graphs are particular important:

Trees (graphs without closed paths or cycles): In this case it is possible on ensure completeness of deduction by state propagation on the simple links between the relations.

Example:

TABLE 8

| R0: A ⇒ (B ∨ C)  |   |
|---|---|
| R1: (B ∨ C) ⇒ D  | ☐0──(BC)──☐1 |

Graphs with closed paths or cycles: The cycles must be eliminated to ensure completeness of deduction by simple state propagation. Example:

TABLE 9

| R0: (A ∨ B) ⇒ (C ∨ D) |   |
|---|---|
| R1: C ⇒ E ∧ F | (graph with nodes 0, 1, 2 |
| R2: D ⇒ E ∧ G | connected via C, D, E) |

Before further colligation, the relations are grouped into clusters, all of which can be linked together without cycles. When the colligation graph of relations is a tree, each relation is thus associated with a single cluster.

FIG. 6 illustrates the colligation graph of a given system. Of course, we may eliminate all cycles by grouping the relations into a single cluster. However, in order to make the succeeding colligation process most efficient on large systems, it is desirable to group the relations into the maximum number of clusters. In this example, the maximum number of clusters is four as shown in FIG. 7.

In the case of input-output systems, each relation is a function (output=f(input)). The predefined flow of data from input nodes to output nodes is depicted in a directed colligation graph. When the graph is acyclic (no cycles or strong components), the data flow is complete by a simple state propagation from input to output. In the case of a cyclic digraph, the cycles must be eliminated by grouping the associated relations (functions) into clusters as shown above.

FIG. 8 illustrates a predefined dataflow on the system in FIG. 6 assuming that each relation is a function. We note that the graph is acyclic and the flow is thus complete with a state propagation from R0 to R15.

5.2.3 Colligate Relations In Each Cluster

The major steps are sketched in FIG. 9. In order to ensure completeness of deduction, all cycles in the cluster must be eliminated (FIG. 9.1). The nested run-time cluster (FIG. 9.2) is an alternative compact and efficient representation of the cluster configuration space.

5.2.3.1 Cycle Elimination: Determine Tree Structure of Colligated Relations (FIG. 9.1)

When a list of relations closing one or more cycles in a cluster are large and sparsely connected, the "combinational explosion" will make it impossible to join the list into a single relation. Therefore, we will generate an equivalent but much more compact list of colligated subspaces; that is, a new list of relations with the following characteristics:

Each user-defined variable (domain variable) is only present in a single relation.
The relations are linked together by system generated link variables yielding a tree structure (without cycles).
Each local Cartesian subspace of legal combinations is associated with a unique link variable with a unique index.

Thus, we will isolate variables present in a single relation and perform the colligation only on subspaces with common variables. The five-step procedure shown in FIG. 10 can be used on any set of relations, even when the colligation graph is acyclic.

EXAMPLE

Given the cluster relations R0, R1, R2 closing a single cycle:

TABLE 10

| R0: (A ∨ B) ⇒ (C ∨ D) |   |
|---|---|
| R1: C ⇒ E | (graph with nodes 0, 1, 2 |
| R2: D ⇒ E | connected via C, D, E) |

The standard array form of each compiled relation is:

TABLE 11

| R0 | | | | R1 | | R2 | |
|---|---|---|---|---|---|---|---|
| A | B | C | D | C | E | D | E |
| 0 | 0 | 0 | 0 | 0 | 0 1 | 0 | 0 1 |
| 0 1 | 0 1 | 0 1 | 1 | 1 | 1 | 1 | 1 |
| 0 1 | 0 1 | 1 | 0 |   |   |   |   |

List of relation(s) on isolated (non-connecting) variables (FIG. 10.1 and FIG. 10.2):

TABLE 12

| A | B | Link0 |
|---|---|---|
| 0 | 0 | 0 |
| 0 1 | 0 1 | 1 |
| 0 1 | 0 1 | 2 |

List of relations on connecting variables (FIG. 10.1):

TABLE 13

| C | D | Link0 | C | E | D | E |
|---|---|---|---|---|---|---|
| 0 | 0 | 0 | 0 | 0 1 | 0 | 0 1 |
| 0 1 | 1 | 1 | 1 | 1 | 1 | 1 |
| 1 | 0 | 2 |   |   |   |   |

When the list of relations on connecting variables is joined (FIG. 10.4), we have the following result with two relations on isolated domain variables and one common link variable Link0:

TABLE 14

| A | B | Link0 |
|---|---|---|
| 0 | 0 | 0 |
| 0 1 | 0 1 | 1 2 |

| C | D | E | Link0 |
|---|---|---|---|
| 0 | 0 | 0 1 | 0 |
| 0 1 | 1 | 1 | 1 |
| 1 | 0 | 1 | 2 |

The tree structure of colligated relation fulfills the requirements for completeness, compactness, and speed of simulation. Completeness of deduction is ensured by state propagation on the relations in the tree (see Section 0). The nested cluster representation to be introduced in the following is an alternative (isomorphic) representation.

Sometimes the user-defined relations are including internal system variables (interim variables), which can be eliminated. An example is network problems with input and output nodes (which are connected to the environment) and a number of internal nodes connecting input and output nodes. When the network constraints are represented in the ADB, it is desirable to eliminate the internal variables and to represent only the subspaces on the input-output variables.

5.2.3.2 Determine Nested Run-time Cluster (Optionally)

The aim of the following task is to determine a very compact run-time cluster representation, which can be simulated by simple coordinate indexing and table look-up without state propagation—even on small scale computers and controllers like, say, electronic relays.

The run-time cluster consists of the original domain relations extended with link variables addressing the Cartesian subspaces, and a set of system relations representing the relations between link variables. The impact of each Cartesian subspace on the entire system is determined by asserting the associated link variable index and then deducing the state of each link variable. This deduction is for example carried out by state deductions on each link variable index. The state deductions may be executed in parallel.

The determination of the nested run-time cluster is shown in FIG. 11.

EXAMPLE

Let us again consider the cluster Table 10 with three relations R0, R1, R2:

The run-time cluster depicted below consists of the three domain relations (left row) and the three associated system relations (right row). For example, in system relation 0, the three indices of link variable Link0 (representing the Cartesian subspaces of R0) is used as the input to deduce the constraints on each link variable. Thus, system relation 0 represents the impact of the Cartesian subspaces in R0 on the entire system.

TABLE 15

| R0 | | | | | System relation 0 | | |
|---|---|---|---|---|---|---|---|
| A | B | C | D | Link0 | Link0 | Link1 | Link2 |
| 0 | 0 | 0 | 0 | 0 | 0 | 0 1 | 0 1 |
| 0 1 | 0 1 | 0 1 | 1 | 1 | 1 | 1 | 1 |
| 0 1 | 0 1 | 1 | 0 | 2 | 2 | 1 | 1 |

| R1 | | | System relation 1 | | |
|---|---|---|---|---|---|
| B | D | Link1 | Link0 | Link1 | Link2 |
| 0 | 0 | 0 | 0 | 0 | 0 |
| 0 1 | 1 | 1 | 0 1 2 | 1 | 1 |

| R2 | | | System relation 2 | | |
|---|---|---|---|---|---|
| C | D | Link2 | Link0 | Link1 | Link2 |
| 0 | 0 | 0 | 0 | 0 | 0 |
| 0 1 | 1 | 1 | 0 1 2 | 1 | 1 |

5.2.4 Link Clusters

We have now finished colligation of the relation(s) in each cluster, and the final step in the process of colligation is to colligate all relation pairs, which are connecting clusters. For example, in the system sketched in FIG. 7 the relation pairs ($3_{cluster0}$ $3_{cluster1}$), (9 10) and (10 12) must be colligated.

The data flow of linking clusters is shown in FIG. 12.

The result of colligating a relation pair is a new relation (to be termed link relation in the following) on the common variables and the two link variables. When the set of link relations is added to the array database, it is possible to ensure completeness of deduction by state propagation on the clusters and the link relations.

FIG. 13 illustrates in more detail the colligation of each relation pair (FIG. 13.2).

EXAMPLE

Given the relation pair R0, R1:

TABLE 16

| R0 | (A ∨ B) ⇒ (C ∨ D) |
| R1 | (C ∨ D) ⇒ (E ∧ F) |

Obviously, the simplest way to colligate these simple relations is to join the pair into a single:

TABLE 17

| A | B | C | D | E | F |
|---|---|---|---|---|---|
| 0 | 0 | 0 | 0 | 0 1 | 0 1 |
| 0 1 | 0 1 | 0 1 | 1 | 1 | 1 |
| 0 1 | 0 1 | 1 | 0 | 1 | 1 |

However, to illustrate the isomorphic form of link relations, we will extend the standard array form of R0, R1 with link variables:

TABLE 18

| R0: (A ∨ B) ⇒ (C ∨ D) | | | | |
|---|---|---|---|---|
| A | B | C | D | Link0 |
| 0 | 0 | 0 | 0 | 0 |
| 0 1 | 0 1 | 0 1 | 1 | 1 |
| 0 1 | 0 1 | 1 | 0 | 2 |

| R1: (C ∨ D) ⇒ (E ∧ F) | | | | |
|---|---|---|---|---|
| C | D | E | F | Link1 |
| 0 | 0 | 0 1 | 0 | 0 |
| 0 | 0 | 0 | 1 | 1 |
| 0 1 | 0 1 | 1 | 1 | 2 |

Colligating the subspaces on the common variables C, D yields the following link relation:

TABLE 19

| Link relation: R0 R1 | | | |
|---|---|---|---|
| C | D | Link0 | Link1 |
| 0 | 0 | 0 | 0 1 2 |
| 0 1 | 1 | 1 | 2 |
| 1 | 0 | 2 | 2 |

In addition to the argument relations R0,R1 the link relation makes it possible to address the entire configuration space on the indices of the link variables. On large and sparsely connected relations, this is a more compact representation than joining the relations.

5.3 Add Object Functions (Optionally)

The configuration space of legal combinations may be extended with user-defined object functions to be manipulated heuristically, e.g. a fuzzy value (for fuzzy logic computations), a weight or a price (for optimization).

An object function 0 is defined on a subset on the state variables $S_0, S_1 \ldots S_n$: $O=f(S_0 \ S_1 \ldots S_n)$ and is compiled into standard array form.

EXAMPLE

Given a system model with the configuration space (WIDTH, LENGTH) and the object function PRIZE=f (WIDTH, LENGTH) represented in a single relation in standard array form:

TABLE 20

| WIDTH | LENGTH | PRIZE |
|---|---|---|
| 1 | 2 | 2.5 |
| 1 | 4 | 4.0 |
| 1 | 6 | 3.3 |
| 1 | 8 | 8.4 |
| 4 | 6 | 20.2 |
| 4 | 8 | 30.0 |
| 5 | 6 | 14.0 |
| 5 | 8 | 17.2 |

When the object function is to be optimized during system simulation, we may also represent the configuration space of large domains in terms of Cartesian subspaces on which the object function is monotonic:

TABLE 21

| WIDTH | LENGTH | PRIZE |
|---|---|---|
| 1 | 2 4 | [2.5 4.0] |
| 1 | 6 8 | [3.3 8.4] |
| 5 4 | 6 8 | [14.0 30.0] |

The object function of each Cartesian subspace is given by an interval with the lower and upper boundary, and the associated state variables are ordered to make the object function increasing.

The object function may be linked to the configuration space in either of two ways:

1. If the configuration space of the state variables $S_0, S_1, \ldots S_n$ is represented in a single relation (in standard array form), the relation may be extended with a further attribute O representing the object function. This is to be considered as a special case as shown in Table 3.
2. In general, it is more convenient to add the object function as a new relation in standard array form on the attributes O, $S_0$, $S_1, \ldots S_n$ and the link variables associated with the configuration space of $S_0, S_1, \ldots S_n$.

The flow chart of adding object functions is shown in FIG. 14.

EXAMPLE

Given the following configuration space in terms of three relations:

TABLE 22

| R0 | | | | |
|---|---|---|---|---|
| A | B | C | D | Link0 |
| 0 | 0 | 0 | 0 | 0 |
| 0 1 | 0 1 | 0 1 | 1 | 1 |
| 0 1 | 0 1 | 1 | 0 | 2 |

TABLE 22-continued

| R1 | | | | |
|---|---|---|---|---|
| C | D | E | F | Link1 |
| 0 | 0 | 0 1 | 0 | 0 |
| 0 | 0 | 0 | 1 | 1 |
| 0 1 | 0 1 | 1 | 1 | 2 |

| Link relation: R0 R1 | | | |
|---|---|---|---|
| C | D | Link0 | Link1 |
| 0 | 0 | 0 | 0 1 2 |
| 0 1 | 1 | 1 | 2 |
| 1 | 0 | 2 | 2 |

The object function Y=f(B,E) is added to the array database by a projection on all link variables associated with the state variables B,E:

TABLE 23

| Y = f (B, E) | | | | |
|---|---|---|---|---|
| B | E | Y | Link0 | Link1 |
| 0 | 0 | 20 | 0 | 0 1 |
| 0 | 1 | 30 | 0 1 2 | 0 2 |
| 1 | 1 | 40 | 1 2 | 2 |

6 ADB SIMULATION

When the modeling task is finished, the array database is prepared for a very efficient simulation, which can be performed in real time. The major operation for ADB simulation is the state deduction shown in FIG. 2.

The state vector represents the state (the legal values) of each state variable. In the input state vector SV1, one or more variables are bounded due to external measurements or assertions. The deduced state vector SV2 represents the resulting constraints on all variables, when the system constraints and the constraints of the input state vector are colligated.

The state deduction is carried out by means of a few array operations (suitable for parallel processing) on the basic components of the array database:

the relations,
the relation clusters,
the interconnected (linked) relation clusters, and
the linked object functions

6.1 The State Deduction on a Single Relation

The state deduction on a single relation in standard array form is carried out by colligating (by intersection) the input state vector (SV1) with the relation succeded by a projection on each variable of the relation yielding the output state vector (SV2). The colligation and projection are described in greater details below.

EXAMPLE

To illustrate, we will again consider the system with the relations R0, R1, R2:

TABLE 24

| R0: | (A ∨ B) ⇒ (C ∨ D) |
| R1: | C ⇒ E |
| R2: | D ⇒ E |

Modeling the system into a single relation (by joining R0, R1, R2) yields:

TABLE 25

| A | B | C | D | E |
|---|---|---|---|---|
| 0 | 0 | 0 | 0 | 0 1 |
| 0 1 | 0 1 | 0 1 | 1 | 1 |
| 0 1 | 0 1 | 1 | 0 | 1 |

We will now deduce all consequences of the external measurement A=1 (true). The following three-step procedure is adopted:
1. Identify all bounded variables in the Input state vector SV1.

A is bounded or constrained to 1, while the other variables are unbounded and thus assigned all the possible domain values (0 1). The input state vector SV1 is therefore:

TABLE 26

| 1 | 0 1 | 0 1 | 0 1 | 0 1 |
|---|-----|-----|-----|-----|
| A | B | C | D | E |

2. Colligate the constraints of the relation and the Input state vector SV1.

Each Cartesian subspace in the relation is intersected with SV1, item by item (variable by variable). The most efficient operation is to select only the bounded input variables and to compute the intersection axis by axis (suitable for parallel processing if desired). Non-valid (empty) Cartesian subspaces are deleted. In the present example, only the first Cartesian subspace is empty and therefore deleted:

TABLE 27

| A | B | C | D | E |
|---|---|---|---|---|
| 1 | 0 1 | 0 1 | 1 | 1 |
| 1 | 0 1 | 1 | 0 | 1 |

3. The output state vector SV2 Is the projection (union of all elements) on each axis.

This operation is also suitable for parallel processing on each axis. The axis projection on Table 27 yields the following output state vector SV2:

TABLE 28

| 1 | 0 1 | 0 1 | 0 1 | 1 |
|---|-----|-----|-----|---|
| A | B | C | D | E |

We conclude that A=E=1, while the other variables are unbounded (don't care or tautology).

This basic state deduction on a single relation is the foundation for state deduction on relation clusters and interconnected clusters. Moreover, it should be noted that this operation can be used on any data type (scale of measurement) on any relation in standard array form, including object functions. In the case of object functions, the input state vector may be constrained by optimization criteria like, say, the minimum prize of a given configuration.

6.2 The State Deduction on a Nested Relation Cluster

The structure of the nested run-time cluster with domain relations and system relations on common link variables was introduced previously (modeling step 2.3.2). The state of the cluster can be deduced very efficiently in a five-step procedure shown in FIG. 15.

The key to the efficient state deduction is that each Cartesian subspace in the complete configuration space has a unique projection on the link variables, which can be deduced (FIG. 15.1–FIG. 15.2) and then indexed (FIG. 15.4–FIG. 15.5) one-by-one or in parallel. No heuristic search is used in this process.

The identification of bounded input variables (FIG. 15.1) is used to select those domain relations, which are candidates to be consulted (there is no reason to consult domain relations only with unbounded variables—these relations will not deduce further constraints on the state vector). However, step (FIG. 15.1) is not essential; all domain relations may be chosen as candidates for the succeeding step (FIG. 15.2). The domain relations (FIG. 15.2) may be consulted one-by-one or in parallel yielding a local output state vector, presumably with new constraints on some variables. If the link variables are still unbounded, the state deduction is completed (FIG. 15.3).

If some link variables are bounded, the impact on the complete cluster is deduced by consulting the system relations (FIG. 15.4) (one-by-one or in parallel).

Finally, the complete impact on the domain variables is deduced by consulting all domain relations with new constraints on the associated link variables (FIG. 15.5). The result is the complete output state vector.

Summing up, parallel processing may be introduced at different levels:

1. Parallel colligation (intersection) of each axis in the individual relations.
2. Parallel projection on each axis in the individual relations.
3. Parallel state deduction on domain relations (10.2).
4. Parallel state deduction on system relations (10.4).
5. Parallel state deduction on domain relations (10.5).

EXAMPLE

Given the nested cluster representation of the following system:

TABLE 29

| R0 | | | | System relation 0 | | | |
|---|---|---|---|---|---|---|---|
| A | B | C | D | Link0 | Link0 | Link1 | Link2 |
| 0 | 0 | 0 | 0 | 0 | 0 | 0 1 | 0 1 |
| 0 1 | 0 1 | 0 1 | 1 | 1 | 1 | 1 | 1 |
| 0 1 | 0 1 | 1 | 0 | 2 | 2 | 1 | 1 |
| R1 | | | System relation 1 | | |
| C | E | Link1 | Link0 | Link1 | Link2 |
| 0 | 0 | 0 | 0 | 0 | 0 |
| 0 1 | 1 | 1 | 0 1 2 | 1 | 1 |

TABLE 29-continued

|  | R2 |  |  | System relation 2 |  |
|---|---|---|---|---|---|
| D | E | Link2 | Link0 | Link1 | Link2 |
| 0 | 0 | 0 | 0 | 0 | 0 |
| 0 1 | 1 | 1 | 0 1 2 | 1 | 1 |

Moreover, given an input state vector SV1. The state deduction on the cluster is carried out as illustrated in FIG. 15:

1. Identify Bounded Domain Variables In The Input State Vector (FIG. 15.1)

Only variable A is bounded:

TABLE 30

| SV1: | | | | | | | |
|---|---|---|---|---|---|---|---|
| 1 | 0 1 | 0 1 | 0 1 | 0 1 | 0 1 2 | 0 1 | 0 1 |
| A | B | C | D | E | Link0 | Link1 | Link2 |

2. Consult All Domain Relations With Bounded Domain Variables (FIG. 15.2)

R0 is the only domain relation on the bounded variable A. Thus; there is no reason to consult R1 and R2. Consulting R0 yields a local output state vector with new constraints on Link0:

TABLE 31

| Conjunction R0 ∧ SV1: | | | | | |
|---|---|---|---|---|---|
| A | B | C | D | Link0 | |
| 1 | 0 1 | 0 1 | 1 1 | 1 | ⇒ |
| 1 | 0 1 | 1 | 0 | 2 | |
| Local output SV: | | | | | | | |
| 1 | 0 1 | 0 1 | 0 1 | 0 1 | 1 2 | 0 1 | 0 1 |
| A | B | C | D | E | Link0 | Link1 | Link2 |

3. Consult All System Relations Associated With Bounded Link Variables (FIG. 15.4)

TABLE 32

| System rel.0 ∧ SV: | | | |
|---|---|---|---|
| Link0 | Link1 | Link2 | |
| 1 | 1 | 1 | ⇒ |
| 2 | 1 | 1 | |
| Local output SV: | | | | | | | |
| 1 | 0 1 | 0 1 | 0 1 | 0 1 | 1 2 | 1 | 1 |
| A | B | C | D | E | Link0 | Link1 | Link2 |

4. Consult All Domain Relations With Bounded Link Variables (FIG. 15.5)

The domain relations associated with bounded link variables are consulted yielding the global output state vector SV2:

TABLE 33

| R1 ∧ SV: | | |
|---|---|---|
| C | E | Link1 |
| 0 1 | 1 | 1 | ⇒ |
| Local output SV: | | | | | | | |
| 1 | 0 1 | 0 1 | 0 1 | 1 | 1 2 | 1 | 1 |
| A | B | C | D | E | Link0 | Link1 | Link2 |

TABLE 34

| R2 ∧ SV: | | |
|---|---|---|
| D | E | Link2 |
| 0 1 | 1 | 1 | ⇒ |
| SV2: | | | | | | | |
| 1 | 0 1 | 0 1 | 0 1 | 1 | 1 2 | 1 | 1 |
| A | B | C | D | E | Link0 | Link1 | Link2 |

6.3 State Propagation

State deduction on interconnected clusters is carried out by state propagation as shown in FIG. 16. All cluster relations with bounded variables are consulted and the state vector updated repeatedly, until no further information can be deduced. In practice, the propagation is controlled by the link variables: when no further constraints can be deduced on the link variables, the propagation is finished.

Completeness of deduction is ensured with state propagation, whenever the colligation graph is acyclic. Thus, state propagation can be used on the following structures:

- The configuration space of interconnected clusters on common link variables
- Object functions connected with the configuration space on common link variables
- Dynamic systems with predefined input and output variables (acyclic digraph)

7 ILLUSTRATIVE EXAMPLES

The following small examples illustrate different applications of the invention.

7.1 Combinational Network

The constraints of the small combinational network shown in FIG. 17 are given by the interconnections of the logical gates. The input file for the array database describes the domain of variables and the user-defined relations:

| DOMAIN | | |
|---|---|---|
| A, | Interim, | Boolean; |
| B, | Interim, | Boolean; |
| C, | Interim, | Boolean; |
| D, | Interim, | Boolean; |

-continued

DOMAIN

| | | |
|---|---|---|
| E, | Interim, | Boolean; |
| F, | Interim, | Boolean; |
| G, | Interim, | Boolean; |
| H, | Interim, | Boolean; |
| I, | Interim, | Boolean; |
| J, | Interim, | Boolean; |
| I1, | Input, | Boolean; |
| I2, | Input, | Boolean; |
| O1, | Output, | Boolean; |
| O2, | Output, | Boolean; |

RELATIONS
  A=not I1;
  B=(I1 and I2);
  C=not I2;
  D=not (A or B);
  E=(D or B);
  F=(B or G);
  G=not (B or C);
  H=not D;
  I=(E or F);
  J=not G;
  O1=(H and I);
  O2=(I and J);

Modeling the array database yields the following result with all user-defined relations joined into a single database relation with just 4 legal states or combinations:

TABLE 35

| A | B | C | D | E | F | G | H | I | J | I1 | I2 | O1 | O2 |
|---|---|---|---|---|---|---|---|---|---|----|----|----|----|
| 0 | 0 | 1 | 1 | 1 | 0 | 0 | 0 | 1 | 1 | 1  | 0  | 0  | 1  |
| 0 | 1 | 0 | 0 | 1 | 1 | 0 | 1 | 1 | 1 | 1  | 1  | 1  | 1  |
| 1 | 0 | 0 | 0 | 0 | 1 | 1 | 1 | 1 | 0 | 0  | 1  | 1  | 0  |
| 1 | 0 | 1 | 0 | 0 | 0 | 0 | 1 | 0 | 1 | 0  | 0  | 0  | 0  |

We conclude that I1=O2 and I2=O1; that is, all gates could be removed!

In FIG. 18 an example of a simulation environment is depicted. The variable O2 is asserted/assigned the state O2=1 (true) with all consequences deduced. It is seen that any variable or combination of variables can be used as input—there is no distinction between input and output variables.

7.2 Alarm System

Given the following input file for a small alarm system with three state variables on different data types:
DOMAIN
  ALARM, Boolean;
  SIGNAL, Enum(Red, Yellow, Green, Blue);
  TEMP, Interval(]11;30],[100;[);
RELATIONS
  TEMP([100;[)→SIGNAL(Yellow,Blue);
  TEMP(1120;[)→ALARM;

The two relations have one common variable TEMP and must therefore be colligated. Joining the relations yields the following array database with three legal Cartesian subspaces on a single relation:

TABLE 36

| ALARM | SIGNAL | TEMP |
|---|---|---|
| 0, 1 | Red, Yellow, Green, Blue | ]11; 30] |
| 0 | Yellow, Blue | [100; 120] |
| 1 | Yellow, Blue | [100; [ |

Note that the relation is depicted with the legal domain values rather than the domain indices. The internal binary representation is shown in Table 37.

TABLE 37

| ALARM | SIGNAL | TEMP |
|---|---|---|
| 0,1 | 0,1,2,3 | 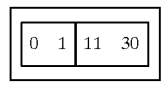 |
| 0 | 1,3 | 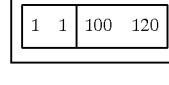 |
| 1 | 1,3 | 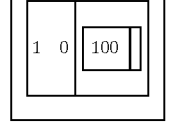 |

7.3 Product Configuration

We will now assume that a car manufacturer wants all the possible combinations of customer options to be available on the Internet.

Given the following array database input file with the logical constraints of the cars:
DOMAIN
  Model, Input, Enum(c300 "CAR 300",
    c300i_cab "CAR 300 Cabriolet",
    c300_cab "CAR 300 Turbo 16 Cabriolet",
    c3000_cc "CAR 3000 CC",
    c3000_cs "CAR 3000 CS",
    c3000_cd "CAR 3000 CD")
    , "Car model";
  Engine, Input, Enum(m_20_16 "2,0i 16, 128 hp, 173 Nm at 3000 rpm",
    m_21_16 "2,1i 16, 140 hp, 180 Nm at 2900 rpm",
    m_s "2,0S 16, 145 hp, 205 Nm at 3800 rpm",
    m_turbo_16 "Turbo 16, 160 hp, 255 Nm at 2800 rpm",
    c_3000 "2,0 16, 130 hp, 173 Nm at 3750 rpm",
    c_3000_23 "2,3 16, 150 hp, 212 Nm at 3800 rpm",
    c_3000_23_turbo "2,3 Turbo, 200 hp, 330 Nm at 2000 rpm",
    c_3000_23_turbos "2,3 TurboS, 200 hp, 330 Nm at 2000 rpm")
    , "Engine type";
  Doors, Input, Integer(2 "Two doors",
    3 "Three doors",
    4 "Four doors",
    5 "Five doors")
    , "Number of doors";
  PaintType, Input, Enum(Normal "Normal paint",
    Metallic "Metallic paint")

, "The type of paint";
PaintColour, Input, Integer(153 "Cirrus white",
170 "Black",
198 "Embassy blue",
214 "Cherry red",
219 "Talladega red",
223 "Odoardo grey metallic",
227 "Citrin beige metallic",
228 "Platana grey metallic",
229 "Le Mans blue metallic",
230 "Scarabe green metallic",
231 "Monte Carlo yellow",
232 "Derby grey",
233 "Carrara white",
234 "Nocturnal blue metallic",
235 "Eucalyptus green metallic")
, "The paint colour";
WheelType, Input, Enum(NoAlloy "No Alloy wheels",
Alloy1 "Alloy wheels 15 spokes, open",
Alloy4 "Alloy wheels, Aero design",
Alloy6 "Alloy wheels, 15 spokes, closed",
Alloy7 "Alloy wheels, 3 spokes, asymmetric")
, "Wheel type";
FrontSeat, Input, Enum(MAS "Manually adjustable front seats",
EAS1 "Elec. adjust. left front seat",
EAS2 "Elec. adjust. front seats",
EAS1M "Elec. adjust. left front seat, memory",
EAS2M "Elec. adjust. front seats, memory")
, "Front seats type";
SunshineRoof, Input, Enum(NoSSR "NoSSR",
SSR1 "SSR1",
SSR2 "SSR2",
SSR3 "SSR3")
, "Sunshine roof";
GearBox, Input, Enum(Manual "Manual",
Automatic "Automatic")
, "Gearbox type";
RELATIONS
Model(c300i_cab)→Engine(m_21_16);
Engine(c_3000)→Model(c3000_cc,c3000_cs,c3000_cd);
Model(c3000 cc)→Engine(c_3000);
Model(c3000_cd,c3000_cs)→not Engine(m_20_16, m_21_16,m_s,m_turbo_16);
Model(c300_cab)→Engine(m_turbo_16);
Engine(c_3000_23_turbos)→Model(c3000_cs);
Engine(c_3000_23,c_3000_$_{23}$_turbo)→Model (c3000_cs,c3000_cd);
Model(c300)→Engine(m_20_16,m_21_16,m_s,m_turbo_16);
Model(c300i_cab,c300_cab)=Doors(2);
(Model(c300) and Engine(m_turbo_16))→not Doors(4);
Model(c3000_cd)→Doors(4);
Model(c3000_cs,c3000_cc)→Doors(5);
Engine(m_20_16)→FrontSeat(MAS);
Engine(m_21_16,m_s,m_turbo_16)→not FrontSeat (EAS1M,EAS2M);
Engine(c_3000_$_{23}$_turbos)→FrontSeat(EAS2M);
Model(c300_cab)→FrontSeat(EAS2);
Model(c300i_cab,c300_cab)→not FrontSeat(EAS1M, EAS2M);
(Model(c300) or Engine(m_21_16))→not FrontSeat (EAS1,EAS2);
Engine(m_20_16)→not SunshineRoof(SSR3,SSR2);
Engine(m_21_16)→not SunshineRoof(SSR2);
Engine(c_3000_23,c_3000_23_turbo,c_3000_23_turbos)→not SunshineRoof(SSR1);
Engine(m_s)→not SunshineRoof(SSR3);
Engine(m_turbo_16)→not SunshineRoof(SSR1,SSR3);
Model(c3000_cc)→SunshineRoof(NoSSR,SSR2);
Model(c300i_cab,c300_cab)→SunshineRoof(NoSSR);
(Engine(c_3000) and Model(c3000_cd,c3000_cs))→not SunshineRoof(SSR1);
Model(c300,c300i_cab,c300_cab)→PaintColour(223);
Model(c300)→not PaintColour(231,235);
Engine(c_3000,c_3000_23,c_3000_23_turbo,c_3000_23_turbos)→not PaintColour(231,235);
Engine(c_3000_23_turbos)→not PaintColour(198,214, 232,233,227,230,234);
Engine(m_20_16,m_21_16)→not WheelType(Alloy1, Alloy4,Alloy7);
Engine(c_3000_23)→not WheelType(Alloy4,Alloy6, Alloy7);
Engine(c_3000_23_turbos)→WheelType(Alloy4);
Engine(c_3000_23_turbo)→WheelType(Alloy7);
Engine(m_s)→WheelType(Alloy1);
Engine(m_turbo_16)→not WheelType(Alloy4,Alloy6);
Model(c300_cab)→WheelType(Alloy7);
Model(c300i_cab,c3000_cc)→not WheelType(Alloy1, Alloy4,Alloy7);
(Engine(c_3000) and Model(c3000_cd,c3000_cs))→not WheelType(Alloy1,Alloy4,Alloy7);
(Model(c300) and Engine(m_turbo_16))→WheelType (Alloy1);
Engine(c_3000_23_turbos)→GearBox(Manual);
PaintType(Metallic)=PaintColour(223,227,228,229,230, 234,235);

Note that the user-defined relations can be written in any order and in many different ways. In the abovementioned relations, the user has written many symbolic expressions with logical implications (IF-THEN) rather than a few tables. The modeling process is independent of the input format.

Modeling the input file yields the following array database with five relations representing the configuration space of the car. These relations are interconnected by common link variables:

TABLE 38

| FrontSeat | SunshineRoof | LINK 00000 |
|---|---|---|
| MAS | NoSSR | 0 |
| MAS | SSR1 | 1 |

TABLE 38-continued

|  | MAS | SSR3 | 2 |  |
|---|---|---|---|---|
|  | MAS | SSR2 | 3 |  |
|  | EAS1 | NoSSR | 4 |  |
|  | EAS1 | SSR3 | 5 |  |
|  | EAS1 | SSR2 | 6 |  |
|  | EAS2 | NoSSR | 7 |  |
|  | EAS2 | SSR3 | 8 |  |
|  | EAS2 | SSR2 | 9 |  |
|  | EAS1M | NoSSR | 10 |  |
|  | EAS1M | SSR3 | 11 |  |
|  | EAS1M | SSR2 | 12 |  |
|  | EAS2M | NoSSR | 13 |  |
|  | EAS2M | SSR3 | 14 |  |
|  | EAS2M | SSR2 | 15 |  |

| Doors | WheelType | LINK 00001 |
|---|---|---|
| 3, 4, 5 | NoAlloy, Alloy6 | 0 |
| 3, 4, 5 | Alloy1 | 1 |
| 3, 5 | Alloy1 | 2 |
| 2 | NoAlloy, Alloy6 | 3 |
| 2 | Alloy7 | 4 |
| 5 | NoAlloy, Alloy6 | 5 |
| 5 | NoAlloy, Alloy1 | 6 |
| 5 | Alloy7 | 7 |
| 4 | NoAlloy, Alloy6 | 8 |
| 4 | NoAlloy, Alloy1 | 9 |
| 4 | Alloy7 | 10 |
| 5 | Alloy4 | 11 |

| Engine | GearBox | LINK 00003 |
|---|---|---|
| m_20_16 | Manual, Automatic | 0 |
| m_21_16 | Manual, Automatic | 1 |
| m_s | Manual, Automatic | 2 |
| m_turbo_16 | Manual, Automatic | 3 |
| c_3000 | Manual, Automatic | 4, 5 |
| c_3000_23 | Manual, Automatic | 6, 7 |
| c_3000_23_turbo | Manual, Automatic | 8, 9 |
| c_3000_23_turbos | Manual | 10, 11 |

| Model | LINK 00000 | LINK 00001 | LINK 00002 |
|---|---|---|---|
| c300 | 0, 1 | 0 | 0 |
| c300 | 0, 1, 2 | 0 | 1 |
| c300 | 0, 1, 3 | 1 | 2 |
| c300 | 0, 3 | 2 | 3 |
| c300i_cab | 0 | 3 | 4 |
| c300_cab | 7 | 4 | 5 |
| c3000_cc | 0, 3, 4, 6, 7, 9, 10, 12, 13, 15 | 5 | 6 |
| c3000_cs | 0, 2, 3, 4, 5, 6, 7, 8, 9, 10, 11, 12, 13, 14, 15 | 5 | 7 |
| c3000_cs | 0, 2, 3, 4, 5, 6, 7, 8, 9, 10, 11, 12, 13, 14, 15 | 6 | 8 |
| c3000_cs | 0, 2, 3, 4, 5, 6, 7, 8, 9, 10, 11, 12, 13, 14, 15 | 7 | 9 |
| c3000_cd | 0, 2, 3, 4, 5, 6, 7, 8, 9, 10, 11, 12, 13, 14, 15 | 8 | 10 |
| c3000_cd | 0, 2, 3, 4, 5, 6, 7, 8, 9, 10, 11, 12, 13, 14, 15 | 9 | 11 |
| c3000_cd | 0, 2, 3, 4, 5, 6, 7, 8, 9, 10, 11, 12, 13, 14, 15 | 10 | 12 |
| c3000_cs | 13, 14, 15 | 11 | 13 |

| PaintType | PaintColour | LINK 00002 | LINK 00003 |
|---|---|---|---|
| Metallic | 223 | 0 | 0 |
| Metallic | 223 | 1, 4 | 1 |
| Metallic | 223 | 2 | 2 |
| Metallic | 223 | 3, 5 | 3 |
| Normal | 153, 170, 198, 214, 219, 232, 233 | 6, 7, 10 | 4 |
| Metallic | 223, 227, 228, 229, 230, 234 | 6, 7, 10 | 5 |
| Normal | 153, 170, 198, 214, 219, 232, 233 | 8, 11 | 6 |
| Metallic | 223, 227, 228, 229, 230, 234 | 8, 11 | 7 |
| Normal | 153, 170, 198, 214, 219, 232, 233 | 9, 12 | 8 |
| Metallic | 223, 227, 228, 229, 230, 234 | 9, 12 | 9 |
| Normal | 153, 170, 219 | 13 | 10 |
| Metallic | 223, 228, 229 | 13 | 11 |

The array database in Table 38 can be stored on an Internet server to make it accessible for any client on the network. This is carried out in either of two ways:

The array database is loaded to the client before simulation

The array database is stored on the server and simulated from the client through the network (only the state vector is transmitted)

To illustrate, let us assume that a customer wants a car with two doors. The deduced state vector with all consequences is depicted in FIG. 19. We conclude that only the cabriolet cars are available with two doors—and the sunshine roof is not a legal option!

What is claimed is:

1. A method for generating a database useful for configuring and/or optimizing a system spanned by variables on finite domains and/or intervals, the method comprising generating and storing, in a memory or storage medium of a computer, an addressable configuration space of the entire system in terms of all legal Cartesian subspaces of states or combinations satisfying the conjunction of substantially all system constraints on all variables, with all interconnected legal Cartesian subspaces being addressable as legal combinations of indices of link variables, so as to establish a database in which substantially all legal solutions in the system are stored as nested arrays.

2. A method according to claim 1, wherein all illegal sates or combinations violating the system constrains are excluded from the relations.

3. A method according to claim 2, wherein, if just a single relation of a system is found to have no legal combination or state, the entire system is considered to be in a state of contradiction or inconsistency and is excluded.

4. A method according to claim 1, wherein the system constraints are determined by conjugating one or more relations, each relation representing the legal Cartesian subspaces of states or combinations on a given subset of variables.

5. A method according to claim 1, wherein all relations with at least one common variable are colligated.

6. A method according to claim 5, wherein the colligation comprises conjugating the constraints of two or more relations being connected by having common variables to establish the Cartesian subspace(s) satisfying the combined constraints of the two or more relations.

7. A method according to claim 5, wherein the colligation of the two or more relations is performed by joining the two or more relations up to a predetermined limit, the resulting number of relations being colligated by linking them and grouping them into one or more cluster(s) of relation(s).

8. A method according to claim 7, wherein each relation is extended by adding a unique link variable with a unique index identifying each legal Cartesian subspace on the given subset of variables.

9. A method according to claim 7, wherein all connected relations are grouped into one or more clusters, each relation being associated with a single cluster of relation(s).

10. A method according to claim 7, wherein three or more relations interconnected with common variables generating cycles or closed paths are grouped into a single cluster comprising the three or more relations, the resulting cluster (s) being interconnected in a tree structure without cycles.

11. A method according to claim 10, wherein all constraints of the interconnected relations within each cluster are determined by colligating all interconnecting variables within the cluster thereby determining the configuration space of the entire cluster, all constraints between the three or more link variables being represented as one or more new relations on the three or more link variables.

12. A method according to claim 9, wherein any pair of relations with common variables linking two clusters is colligated by adding a new relation on the common variables and the two link variables.

13. A method according to claim 1, wherein an object function of a given subset of variables, the object function deriving characteristics of the given subset of variables, is linked to the complete configuration space by deducting the constraints on each link variable connected to the given subset of variables.

14. A method according to claim 13, wherein the characteristics of the object function are determined and the constraints on the link variables are deduced on each combination of the given variables, the result being represented as a relation on the object function, the given variables, and the link variables.

15. A method for configuring and/or optimizing a system spanned by variables on finite domains, said method comprising:

providing a database in which substantially all legal solutions in the system are stored as nested arrays, wherein the database is generated by generating and storing, in a memory or storage medium of a computer, an addressable configuration space of the entire system and terms of all legal Cartesian subspaces of states or combinations satisfying the conjunction of substantially all system constraints on all variables, with all interconnected legal Cartesian subspaces being addressable as legal combinations of indices of link variables, so as to establish a database in which substantially all legal solutions in the system are stored as nested arrays; and deducing any subspace, corresponding to an input statement and/or inquiry, of states or combinations spanned by one or more variables of the system represented by the nested arrays by deriving the consequences of a statement and/or an inquiry by applying the constraints defined by the statement and/or inquiry to the database.

16. A method according to claim 15, wherein a deduction of any subspace or states or combinations is performed on a given subset of variable(s) colligated with or without asserted and/or measured states and/or constraints from the environment.

17. A method according to claim 15, wherein all interaction between the system represented by the array database and the environment is performed by a state vector (SV) representing all legal states or values of each variable.

18. A method according to claim 16, wherein an input state vector (SV1) represents the asserted and/or measured states from the environment, while an output state vector (SV2) represents deduced consequence(s) on each variable of the entire system, when the constraints of SV1 are colligated with all system constraints in the array database.

19. A method according to claim 16, wherein the state of the entire system is deduced by consulting one or more relation(s) and/or one or more object function(s) at a time by colligating the given subset of variables in the relation with the given subsets of states in the state vector and then deducing the possible states of each variable.

20. A method according to claim 19, wherein two or more variables are colligated in parallel.

21. A method according to claim 19, wherein the deduction of possible states is performed on two or more variables in parallel.

22. A method according to claim 19, wherein completeness of deduction is performed by consulting connected relations until no further consequences can be deduced on any link variable.

23. A method according to claim 19, wherein at least two relations are consulted in parallel.

24. A method according to claim 19, wherein a state of contradiction is identified by no legal states or values being deducible when consulting a relation.

25. A database useful for configuring and/or optimizing a system spanned by variables on finite domains and/or intervals, the database storing an,addressable configuration space of the entire system in terms of all legal Cartesian subspaces of states or combinations satisfying the conjunction of substantially all system constraints on all variables, with all interconnected legal Cartesian subspaces being addressable as legal combinations of indices of link variables, so that substantially all legal combinations in the system are stored as nested arrays.

26. A database according to claim 25, stored in a memory or storage medium of a machinery and/or computer and/or network.

27. A database according to claim 26, which is stored in the memory or storage medium in such a way that it is accessible for deduction of any subspace of the system by applying input statements and/or inquiries to the database.

28. A database according to claim 26, which is stored in a memory or storage medium which is adapted to be operably connected to a machinery and/or computer and/or network so that the database can thereby become accessible for the deduction of any subspace of the system by applying input statements and/or inquiries to the database.

29. A machinery and/or computer and/or network comprising a memory or storage medium in which a database according to claim 25 is stored.

30. A machinery and/or computer and/or network according to claim 29, in which the database is stored in the memory or storage medium in such a way that it is accessible for deduction of any subspace of the system by applying input statements and/or inquiries to the database.

31. A network according to claim 30, in which the database is stored in the memory or storage medium of one or more computer(s) in such a way that the database is accessible for deduction of any subspace of the system by applying input statements and/or inquiries to the database from any computer connected to the network.

32. A memory or storage medium in which a database according to claim 25 is stored.

33. A memory or storage medium according to claim 32, wherein the database is stored in such a way that it is accessible for deduction of any subspace of the system by applying input statements and/or inquiries to the database.

34. A memory or storage medium according to claim 33, which is adapted to be operably connected to a machinery and/or computer and/or network so that the database can thereby become accessible for deduction of any subspace of the system by applying input statements and/or inquiries to the database.

* * * * *

UNITED STATES PATENT AND TRADEMARK OFFICE
CERTIFICATE OF CORRECTION

PATENT NO. : 6,633,863 B1
DATED : October 14, 2003
INVENTOR(S) : Gert Lykke Sorensen Moller and Claus Erik Jensen It is certified that error appears in the above-identified patent and that said Letters Patent is hereby corrected as shown below:

<u>Column 13,</u>
Line 35, should read

-- TABLE 15

| R0 | | | | | System relation 0 | | |
|---|---|---|---|---|---|---|---|
| A | B | C | D | Link0 | Link0 | Link1 | Link2 |
| 0 | 0 | 0 | 0 | 0 | 0 | 0 1 | 0 1 |
| 0 1 | 0 1 | 0 1 | 1 | 1 | 1 | 1 | 1 |
| 0 1 | 0 1 | 1 | 0 | 2 | 2 | 1 | 1 |

| R1 | | | System relation 1 | | |
|---|---|---|---|---|---|
| C | E | Link1 | Link0 | Link1 | Link2 |
| 0 | 0 | 0 | 0 | 0 | 0 |
| 0 1 | 1 | 1 | 0 1 2 | 1 | 1 |

| R2 | | | System relation 2 | | |
|---|---|---|---|---|---|
| D | E | Link2 | Link0 | Link1 | Link2 |
| 0 | 0 | 0 | 0 | 0 | 0 |
| 0 1 | 1 | 1 | 0 1 2 | 1 | 1 |

--

Signed and Sealed this

Twenty-second Day of March, 2005

JON W. DUDAS
*Director of the United States Patent and Trademark Office*